United States Patent
Zhu et al.

(10) Patent No.: US 10,110,344 B2
(45) Date of Patent: Oct. 23, 2018

(54) DATA PACKET TRANSMISSION METHOD AND TRANSMISSION DEVICE

(71) Applicant: HUAWEI TECHNOLOGIES CO., LTD., Shenzhen (CN)

(72) Inventors: Song Zhu, Beijing (CN); Zhenwei Lu, Beijing (CN); Xiaolong Guo, Beijing (CN); Lixue Zhang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 6 days.

(21) Appl. No.: 15/211,516

(22) Filed: Jul. 15, 2016

(65) Prior Publication Data

US 2016/0323065 A1   Nov. 3, 2016

Related U.S. Application Data

(63) Continuation of application No. PCT/CN2014/070823, filed on Jan. 17, 2014.

(51) Int. Cl.
*H04L 1/00* (2006.01)
*H04L 1/22* (2006.01)
(Continued)

(52) U.S. Cl.
CPC ......... *H04L 1/0041* (2013.01); *H04B 7/0456* (2013.01); *H04L 1/22* (2013.01); *H04L 69/22* (2013.01)

(58) Field of Classification Search
None
See application file for complete search history.

(56) References Cited

U.S. PATENT DOCUMENTS

| 8,718,797 B1 * | 5/2014 | Addepalli | ............ H04W 4/046 700/17 |
| 2008/0037658 A1 * | 2/2008 | Price | ............ G10L 19/167 375/240.26 |

(Continued)

FOREIGN PATENT DOCUMENTS

| CN | 101119319 A | 2/2008 |
| CN | 101136722 A | 3/2008 |

(Continued)

OTHER PUBLICATIONS

International Search Report and Written Opinion dated Oct. 29, 2014 in corresponding International Patent Application No. PCT/CN2014/070823.

(Continued)

*Primary Examiner* — Eunsook Choi
(74) *Attorney, Agent, or Firm* — Staas & Halsey LLP

(57) ABSTRACT

The present invention discloses a method. In a process of splitting and sending a data packet, after dividing a data packet to be sent to a destination node into multiple sub data packets, a front end node performs inter-packet combination encoding on the sub data packets in a combination encoding mode, and sends obtained encoded sub data packet groups to the destination node. Even if a channel state of a transmission path suddenly deteriorates, because the destination node does not need to wait to receive all encoded sub data packet groups provided that an original data packet can be parsed out by combining content in a received encoded sub data packet group and a corresponding decoding mode, a process in which the destination node receives the data packet is less affected by a sudden network case, and transmission efficiency is not significantly affected.

20 Claims, 14 Drawing Sheets

(51) Int. Cl.
    *H04B 7/0456*    (2017.01)
    *H04L 29/06*     (2006.01)
    *H04B 7/04*      (2017.01)

(56) References Cited

U.S. PATENT DOCUMENTS

| | | | |
|---|---|---|---|
| 2011/0216651 A1* | 9/2011 | Bansal | H04L 47/20 370/235 |
| 2011/0235509 A1* | 9/2011 | Szymanski | H04L 47/14 370/230 |
| 2011/0261821 A1* | 10/2011 | Hillier, III | H04L 45/245 370/394 |
| 2013/0195106 A1 | 8/2013 | Calmon et al. | |
| 2013/0262949 A1* | 10/2013 | Rayner | H04L 1/08 714/748 |
| 2015/0236813 A1* | 8/2015 | Williams | H04L 1/0007 370/470 |
| 2017/0286241 A1* | 10/2017 | Rayner | G06F 11/2005 |

FOREIGN PATENT DOCUMENTS

| | | |
|---|---|---|
| CN | 102684856 A | 9/2012 |
| EP | 2 020 791 A1 | 2/2009 |
| EP | 2 391 040 A1 | 11/2011 |
| WO | 2006/106617 A1 | 10/2006 |

OTHER PUBLICATIONS

Extended European Search Report dated Nov. 21, 2016 in corresponding European Patent Application No. 14879085.0.
International Search Report dated Oct. 29, 2014 in corresponding International Application No. PCT/CN2014/070823.

* cited by examiner

DATA PACKET TRANSMISSION METHOD AND TRANSMISSION DEVICE

CROSS-REFERENCE TO RELATED APPLICATION

This application is a continuation of International Application No. PCT/CN2014/070823, filed on Jan. 17, 2014, which is hereby incorporated by reference in its entirety.

TECHNICAL FIELD

The present invention relates to the communications field, and in particular, to a data packet transmission method and transmission device.

BACKGROUND

In a process of sending a data packet, when being sent from a source node to a destination node, the data packet passes through different intermediate nodes or has different transmission paths. If in the process of sending the data packet, the data packet is split, so as to enable the data packet to be forwarded separately by using different intermediate nodes or flow through different transmission paths, data packet sending reliability may be effectively improved, and a data packet sending speed may be increased.

A currently used method is as follows: A data packet is divided in advance according to a known node condition or a known transmission path state, and then is forwarded by each node or sent through each transmission path. For example, after a source node determines a transmission path for each part of the data packet, or after intermediate nodes determine their respective to-be-sent parts of the data packet by means of negotiation, a process of sending the data packet is determined, and a data packet sent on each transmission path or a data packet sent by each intermediate node cannot be changed freely. Before the data packet is completely sent, if a channel state of a transmission path changes, or when a network condition of an intermediate node changes, an actual sending process of the data packet is inconsistent with a pre-estimated sending process, and a destination node cannot quickly receive each part of the data packet, which reduces data packet sending efficiency.

SUMMARY

Embodiments of the present invention provide a data packet transmission method and transmission device to resolve a problem of low data packet sending efficiency that exists in the prior art.

According to a first aspect, a data packet transmission method is provided, where the method includes:

acquiring, by a front end node, multiple sub data packets obtained by means of division;

performing, by the front end node, inter-packet combination encoding on the multiple sub data packets, and obtaining multiple encoded sub data packet groups, where one of the encoded sub data packet groups includes at least one encoded sub data packet; and sending, by the front end node, the multiple encoded sub data packet groups to a destination node separately through at least two transmission paths.

With reference to the first aspect, in a first possible implementation manner, the front end node includes at least two intermediate nodes, and the acquiring, by a front end node, multiple sub data packets obtained by means of division includes:

separately receiving, by the at least two intermediate nodes, a data packet from a source node; and dividing, by the at least two intermediate nodes, the received data packets into multiple sub data packets.

With reference to the first aspect, in a second possible implementation manner, the front end node is a source node, and the acquiring, by a front end node, multiple sub data packets obtained by means of division includes:

dividing, by the source node, a data packet into multiple sub data packets.

With reference to the first aspect, in a third possible implementation manner, the front end node includes at least two intermediate nodes, and the acquiring, by a front end node, multiple sub data packets obtained by means of division includes:

receiving, by the at least two intermediate nodes, multiple sub data packets sent by a source node, where the multiple sub data packets are obtained after the source node divides a data packet.

With reference to the first aspect, in a fourth possible implementation manner, the front end node includes a source node and at least one intermediate node, and the acquiring, by a front end node, multiple sub data packets obtained by means of division includes:

receiving, by the at least one intermediate node, a data packet from the source node; and separately dividing, by the source node and the at least one intermediate node, the data packet into multiple sub data packets.

With reference to the first aspect, the first possible implementation manner of the first aspect, the second possible implementation manner of the first aspect, the third possible implementation manner of the first aspect, or the fourth possible implementation manner of the first aspect, in a fifth possible implementation manner, the performing, by the front end node, inter-packet combination encoding on the multiple sub data packets, and obtaining multiple encoded sub data packet groups includes:

performing, by the front end node, inter-packet combination encoding on the multiple sub data packets in a combination encoding mode determined by means of negotiation in advance with the destination node, and obtaining the multiple encoded sub data packet groups; or after performing inter-packet combination encoding on the multiple sub data packets in a combination encoding mode determined by the front end node, and obtaining the multiple encoded sub data packet groups, notifying, by the front end node, the destination node of the used combination encoding mode.

With reference to the fifth possible implementation manner of the first aspect, in a sixth possible implementation manner, the performing, by the front end node, inter-packet combination encoding on the multiple sub data packets in a combination encoding mode determined by means of negotiation in advance with the destination node or in a combination encoding mode determined by the front end node, and obtaining the multiple encoded sub data packet groups includes:

selecting, by the front end node in a linear combination manner determined by means of negotiation in advance with the destination node or in a linear combination manner determined by the front end node, at least one sub data packet from the multiple sub data packets to perform combination encoding, so as to acquire an encoded sub data packet group.

With reference to the sixth possible implementation manner of the first aspect, in a seventh possible implementation manner, when the front end node includes at least two intermediate nodes, the selecting, by the front end node in a linear combination manner determined by means of negotiation in advance with the destination node or in a linear combination manner determined by the front end node, at least one sub data packet from the multiple sub data packets to perform combination encoding includes:

selecting, by each intermediate node in a linear combination manner determined by means of negotiation in advance with the destination node or in a linear combination manner determined by each intermediate node, at least one sub data packet from the multiple sub data packets to perform orthogonalization on linear combination manners, so that content of encoded sub data packet groups obtained by any two intermediate nodes is different.

With reference to the sixth possible implementation manner of the first aspect, in an eighth possible implementation manner, when the front end node is a source node, the sending, by the front end node, the multiple encoded sub data packet groups to a destination node separately through at least two transmission paths includes:

sending, by the source node, the multiple encoded sub data packet groups to the destination node through the at least two transmission paths, where linear combination manners of the encoded sub data packet groups sent on the transmission paths are orthogonal to each other, so that content of encoded sub data packet groups sent on any two transmission paths is different.

With reference to the fifth possible implementation manner of the first aspect, in a ninth possible implementation manner, the performing, by the front end node, inter-packet combination encoding on the multiple sub data packets in a combination encoding mode determined by means of negotiation in advance with the destination node or in a combination encoding mode determined by the front end node, and obtaining the multiple encoded sub data packet groups includes:

determining, by the front end node, a degree of combination encoding by using a degree distribution function determined by means of negotiation in advance or determined by the front end node; and randomly selecting, by the front end node from the sub data packets, sub data packets whose quantity is not greater than the degree, and combining sub data packets selected each time into one encoded sub data packet group; or performing, by the front end node by using a generator matrix determined by means of negotiation in advance or determined by the front end node, combination encoding on the sub data packets to generate encoded sub data packet groups.

With reference to the first aspect, the first possible implementation manner of the first aspect, the second possible implementation manner of the first aspect, the third possible implementation manner of the first aspect, the fourth possible implementation manner of the first aspect, the fifth possible implementation manner of the first aspect, the sixth possible implementation manner of the first aspect, the seventh possible implementation manner of the first aspect, the eighth possible implementation manner of the first aspect, or the ninth possible implementation manner of the first aspect, in a tenth possible implementation manner, the method further includes:

determining, by the front end node, whether a stop indication returned by the destination node is received, or whether a quantity of sent encoded sub data packet groups reaches a maximum quantity of sending times; and if the stop indication is received or the quantity of sent encoded sub data packet groups reaches the maximum quantity of sending times, stopping sending the encoded sub data packet groups to the destination node, where the stop indication is returned after the destination node parses out the data packet.

According to a second aspect, a data packet transmission method is provided, where the method includes:

receiving, by a destination node, encoded sub data packet groups sent by a front end node through multiple transmission paths; and parsing out, by the destination node, the data packet according to the received encoded sub data packet groups and an obtained combination encoding mode.

With reference to the second aspect, in a first possible implementation manner, the parsing out, by the destination node, the data packet according to the received encoded sub data packet groups and an obtained combination encoding mode includes:

parsing out, by the destination node, the data packet according to the received encoded sub data packet groups and a combination encoding mode negotiated in advance with the front end node; or obtaining, by the destination node, the combination encoding mode from a notification message or a header of the sub data packet groups, and parsing out the data packet according to the received encoded sub data packet groups and the obtained combination encoding mode determined by the front end node.

With reference to the second aspect, in a second possible implementation manner, the receiving, by a destination node, sub encoded data packet groups sent by a front end node through multiple transmission paths includes:

when the front end node is at least two intermediate nodes, receiving encoded sub data packet groups sent by the at least two intermediate nodes through at least two transmission paths; or when the front end node is a source node and at least one intermediate node, receiving encoded sub data packet groups sent by the source node and the at least one intermediate node through at least two transmission paths; or when the front end node is a source node, receiving encoded sub data packet groups sent by the source node through at least two transmission paths, where each encoded sub data packet group is obtained after inter-packet combination encoding is performed on at least one sub data packet, and the sub data packet is obtained by dividing a data packet to be sent to the destination node.

With reference to the second aspect, in a third possible implementation manner, the parsing out, by the destination node, the data packet according to the received encoded sub data packet group and an obtained combination encoding mode includes:

determining, by the destination node according to the received encoded sub data packet groups and a combination encoding mode negotiated in advance, or by the destination node according to the received encoded sub data packet groups and a combination encoding mode obtained from a notification message or a header of the sub data packet groups, whether the data packet can be parsed out; if the data packet can be parsed out, returning a stop indication; and otherwise, continuing to receive the encoded sub data packet groups until the data packet is parsed out or no encoded sub data packet group can be received.

According to a third aspect, a data packet transmission device is provided, where the device includes:

an acquiring module, configured to acquire multiple sub data packets obtained by means of division;

an encoding module, configured to: perform inter-packet combination encoding on the multiple sub data packets acquired by the acquiring module, and obtain multiple encoded sub data packet groups, where one of the encoded sub data packet groups includes at least one encoded sub data packet; and a sending module, configured to send, separately through at least two transmission paths, the multiple sub data packet groups obtained by the encoding module to a destination node.

With reference to the third aspect, in a first possible implementation manner, when the device is an intermediate node, the acquiring module is specifically configured to: receive a data packet from a source node, and divide the received data packet into multiple sub data packets.

With reference to the third aspect, in a second possible implementation manner, when the device is a source node, the acquiring module is specifically configured to divide a data packet into multiple sub data packets.

With reference to the third aspect, in a third possible implementation manner, when the device is an intermediate node, the acquiring module is specifically configured to receive multiple sub data packets sent by a source node, where the multiple sub data packets are obtained after the source node divides a data packet.

With reference to the third aspect, the first possible implementation manner of the third aspect, the second possible implementation manner of the third aspect, or the third possible implementation manner of the third aspect, in a fourth possible implementation manner, the encoding module specifically includes:

an encoding mode determining submodule, configured to: determine a combination encoding mode by means of negotiation in advance with the destination node, or determine a combination encoding mode by the encoding mode determining submodule and notify the destination node of the used combination encoding mode; and a combination encoding submodule, configured to: perform inter-packet combination encoding on the multiple sub data packets in the combination encoding mode determined by the encoding mode determining submodule, and obtain the multiple encoded sub data packet groups.

With reference to the fourth possible implementation manner of the third aspect, in a fifth possible implementation manner, the combination encoding mode determined by the encoding mode determining submodule is a linear combination manner; and the combination encoding submodule is specifically configured to: select, in the linear combination manner determined by the encoding mode determining submodule, at least one sub data packet from the multiple sub data packets to perform combination encoding, so as to acquire an encoded sub data packet group.

With reference to the fifth possible implementation manner of the third aspect, in a sixth possible implementation manner, when the device is an intermediate node, the combination encoding submodule is specifically configured to select, in the linear combination manner determined by the encoding mode determining submodule, at least one sub data packet from the multiple sub data packets to perform orthogonalization on linear combination manners, so that content of encoded sub data packet groups obtained by any two intermediate nodes is different.

With reference to the fifth possible implementation manner of the third aspect, in a seventh possible implementation manner, when the device is a source node, the sending module is specifically configured to send the multiple encoded sub data packet groups to the destination node through the at least two transmission paths, where linear combination manners of the encoded sub data packet groups sent on the transmission paths are orthogonal to each other, so that content of the encoded sub data packet groups sent on the two transmission paths is different.

With reference to the fifth possible implementation manner of the third aspect, in an eighth possible implementation manner, the combination encoding submodule is specifically configured to: determine a degree of combination encoding by using a degree distribution function determined by the encoding mode determining submodule, randomly select sub data packets whose quantity is not greater than the degree from the sub data packets, and combine sub data packets selected each time into one encoded sub data packet group; or is configured to perform, by using a generator matrix determined by the encoding mode determining submodule, combination encoding on the sub data packets to generate encoded sub data packet groups.

With reference to the third aspect, the first possible implementation manner of the third aspect, the second possible implementation manner of the third aspect, the third possible implementation manner of the third aspect, the fourth possible implementation manner of the third aspect, the fifth possible implementation manner of the third aspect, the sixth possible implementation manner of the third aspect, the seventh possible implementation manner of the third aspect, or the eighth possible implementation manner of the third aspect, in a ninth possible implementation manner, the device further includes:

a determining module, configured to determine whether a stop indication returned by the destination node is received, or whether a quantity of sent encoded sub data packet groups reaches a maximum quantity of sending times; and an indication module, configured to: when the determining module determines that the stop indication is received, or the determining module determines that the quantity of sent encoded sub data packet groups reaches the maximum quantity of sending times, stop sending the encoded sub data packet groups to the destination node, where the stop indication is returned after the destination node parses out the data packet.

According to a fourth aspect, a data packet transmission device is provided, where the device includes:

a processor, configured to: acquire multiple sub data packets obtained by means of division, perform inter-packet combination encoding on the acquired multiple sub data packets, and obtain multiple encoded sub data packet groups, where one of the encoded sub data packet groups includes at least one encoded sub data packet; and a transmitter, configured to send, separately through at least two transmission paths, the multiple sub data packet groups obtained by the processor to a destination node.

With reference to the fourth aspect, in a first possible implementation manner, when the device is an intermediate node, the processor is specifically configured to: receive a data packet from a source node, and divide the received data packet into multiple sub data packets.

With reference to the fourth aspect, in a second possible implementation manner, when the device is a source node, the processor is specifically configured to divide a data packet into multiple sub data packets.

With reference to the fourth aspect, in a third possible implementation manner, when the device is an intermediate node, the processor is specifically configured to receive multiple sub data packets sent by a source node, where the multiple sub data packets are obtained after the source node divides a data packet.

With reference to the fourth aspect, the first possible implementation manner of the fourth aspect, the second possible implementation manner of the fourth aspect, or the third possible implementation manner of the fourth aspect, in a fourth possible implementation manner, the processor is specifically configured to: determine a combination encoding mode by means of negotiation in advance with the destination node, or determine a combination encoding mode by itself and notify the destination node of the used combination encoding mode; and perform inter-packet combination encoding on the multiple sub data packets according to the determined combination encoding mode, and obtain the multiple encoded sub data packet groups.

With reference to the fourth possible implementation manner of the fourth aspect, in a fifth possible implementation manner, the processor is configured to: determine that the combination encoding mode is a linear combination manner, and select, in the determined linear combination manner, at least one sub data packet from the multiple sub data packets to perform combination encoding, so as to acquire an encoded sub data packet group.

With reference to the fifth possible implementation manner of the fourth aspect, in a sixth possible implementation manner, when the device is an intermediate node, the processor is specifically configured to select, in the determined linear combination manner, at least one sub data packet from the multiple sub data packets to perform orthogonalization on linear combination manners, so that content of encoded sub data packet groups obtained by any two intermediate nodes is different.

With reference to the fifth possible implementation manner of the fourth aspect, in a seventh possible implementation manner, when the device is a source node, the transmitter is specifically configured to send the multiple encoded sub data packet groups to the destination node through the at least two transmission paths, where linear combination manners of the encoded sub data packet groups sent on the transmission paths are orthogonal to each other, so that content of the encoded sub data packet groups sent on the two transmission paths is different.

With reference to the fifth possible implementation manner of the fourth aspect, in an eighth possible implementation manner, the processor is specifically configured to: determine a degree of combination encoding by using a determined degree distribution function, randomly select sub data packets whose quantity is not greater than the degree from the sub data packets, and combine sub data packets selected each time into one encoded sub data packet group; or is configured to perform, by using a determined generator matrix, combination encoding on the sub data packets to generate encoded sub data packet groups.

With reference to the fourth aspect, the first possible implementation manner of the fourth aspect, the second possible implementation manner of the fourth aspect, the third possible implementation manner of the fourth aspect, the fourth possible implementation manner of the fourth aspect, the fifth possible implementation manner of the fourth aspect, the sixth possible implementation manner of the fourth aspect, the seventh possible implementation manner of the fourth aspect, or the eighth possible implementation manner of the fourth aspect, in a ninth possible implementation manner, the processor is further configured to: determine whether a stop indication returned by the destination node is received, or whether a quantity of sent encoded sub data packet groups reaches a maximum quantity of sending times; and when determining that the stop indication is received, or determining that the quantity of sent encoded sub data packet groups reaches the maximum quantity of sending times, trigger the transmitter to stop sending the encoded sub data packet groups to the destination node, where the stop indication is returned after the destination node parses out the data packet.

According to a fifth aspect, a data packet transmission device is provided, where the device includes:

a receiving module, configured to receive encoded sub data packet groups sent by a front end node through multiple transmission paths; and a parsing module, configured to parse out the data packet according to the encoded sub data packet group received by the receiving module and an obtained combination encoding mode.

With reference to the fifth aspect, in a first possible implementation manner, the parsing module is specifically configured to parse out the data packet according to the encoded sub data packet groups received by the receiving module and a combination encoding mode negotiated in advance with the front end node; or obtain the combination encoding mode from a notification message or a header of the sub data packet groups, and parse out the data packet according to the encoded sub data packet groups received by the receiving module and the obtained combination encoding mode.

With reference to the fifth aspect, in a second possible implementation manner, the receiving module is specifically configured to: when the front end node is at least two intermediate nodes, receive encoded sub data packet groups sent by the at least two intermediate nodes through at least two transmission paths; or when the front end node is a source node and at least one intermediate node, receive encoded sub data packet groups sent by the source node and the at least one intermediate node through at least two transmission paths; or when the front end node is a source node, receive encoded sub data packet groups sent by the source node through at least two transmission paths, where each encoded sub data packet group is obtained after inter-packet combination encoding is performed on at least one sub data packet, and the sub data packet is obtained by dividing a data packet to be sent to a destination node.

With reference to the fifth aspect, in a third possible implementation manner, the parsing module is further configured to: according to the received encoded sub data packet groups and a combination encoding mode negotiated in advance, or according to the received encoded sub data packet groups and a combination encoding mode obtained from a notification message or a header of the sub data packet groups, determine whether the data packet can be parsed out; if the data packet can be parsed out, return a stop indication; and otherwise, continue to receive the encoded sub data packet groups until the data packet is parsed out or no encoded sub data packet group can be received.

According to a sixth aspect, a data packet transmission device is provided, where the device includes:

a receiver, configured to receive encoded sub data packet groups sent by a front end node through multiple transmission paths; and a processor, configured to parse out the data packet according to the encoded sub data packet groups received by the receiver and an obtained combination encoding mode.

With reference to the sixth aspect, in a first possible implementation manner, the processor is specifically configured to parse out the data packet according to the encoded sub data packet groups received by the receiver and a combination encoding mode negotiated in advance with the front end node; or obtain the combination encoding mode from a notification message or a header of the sub data packet groups, and parse out the data packet according to the encoded sub data packet groups received by the receiver and the obtained combination encoding mode.

With reference to the sixth aspect, in a second possible implementation manner, the receiver is specifically configured to: when the front end node is at least two intermediate nodes, receive encoded sub data packet groups sent by the at least two intermediate nodes through at least two transmission paths; or when the front end node is a source node and at least one intermediate node, receive encoded sub data packet groups sent by the source node and the at least one intermediate node through at least two transmission paths; or when the front end node is a source node, receive encoded sub data packet groups sent by the source node through at least two transmission paths, where each encoded sub data packet group is obtained after inter-packet combination encoding is performed on at least one sub data packet, and the sub data packet is obtained by dividing a data packet to be sent to a destination node.

With reference to the sixth aspect, in a third possible implementation manner, the processor is further configured to: according to the received encoded sub data packet groups and a combination encoding mode negotiated in advance, or according to the received encoded sub data packet groups and a combination encoding mode obtained from a notification message or a header of the sub data packet groups, determine whether the data packet can be parsed out; if the data packet can be parsed out, return a stop indication; and otherwise, continue to receive the encoded sub data packet groups until the data packet is parsed out or no encoded sub data packet group can be received.

According to the embodiments of the present invention, in a process of splitting and sending a data packet, after performing inter-packet combination encoding on sub data packets, a front end node sends encoded sub data packet groups to a destination node separately through multiple transmission paths, and the destination node can parse out the data packet according to the encoded sub data packet groups and combination encoding modes of the encoded sub data packet groups. When channel states of some transmission paths or network conditions of some intermediate nodes suddenly deteriorate, the destination node may further acquire an encoded sub data packet group on another transmission path, and the destination node may still parse out an original data packet according to the received encoded sub data packet group and corresponding combination encoding modes, which resolves a problem in the prior art that a destination node can parse out an original data packet only after receiving data packets sent through all transmission paths, thereby improving data packet sending efficiency.

BRIEF DESCRIPTION OF DRAWINGS

To describe the technical solutions in the embodiments of the present invention more clearly, the following briefly describes the accompanying drawings required for describing the embodiments. Apparently, the accompanying drawings in the following description show merely some embodiments of the present invention, and persons of ordinary skill in the art may still derive other drawings from these accompanying drawings without creative efforts.

DESCRIPTION OF EMBODIMENTS

To make the objectives, technical solutions, and advantages of the present invention clearer, the following further describes the present invention in detail with reference to the accompanying drawings. Apparently, the described embodiments are merely a part rather than all of the embodiments of the present invention. All other embodiments obtained by persons of ordinary skill in the art based on the embodiments of the present invention without creative efforts shall fall within the protection scope of the present invention.

To improve data packet sending efficiency, according to the embodiments of the present invention, in a process of splitting and sending a data packet, a function of a front end node is extended, so that the data packet is not directly split and sent after being simply divided any more, but after dividing a data packet to be sent to a destination node into multiple sub data packets, the front end node performs inter-packet combination encoding on the sub data packets, and sends obtained encoded sub data packet groups to the destination node, so that the destination node parses out the original data packet according to the received encoded sub data packet groups and corresponding combination encoding modes. In this process, even if channel states of some transmission paths suddenly deteriorate, because the destination node does not need to wait to receive encoded sub data packet groups sent through all transmission paths provided that the original data packet can be parsed out by using content in the received encoded sub data packet groups, a process in which the destination node receives the data packet is less affected by a sudden network case, an obvious delay is not caused in the data packet transmission process because of sending state changes of some transmission paths, and data packet transmission efficiency is not affected.

The following describes in detail the solutions of the embodiments of the present invention with reference to the accompanying drawings in the specification. However, the solutions of the present invention are not limited to the following embodiments.

Figure 1:
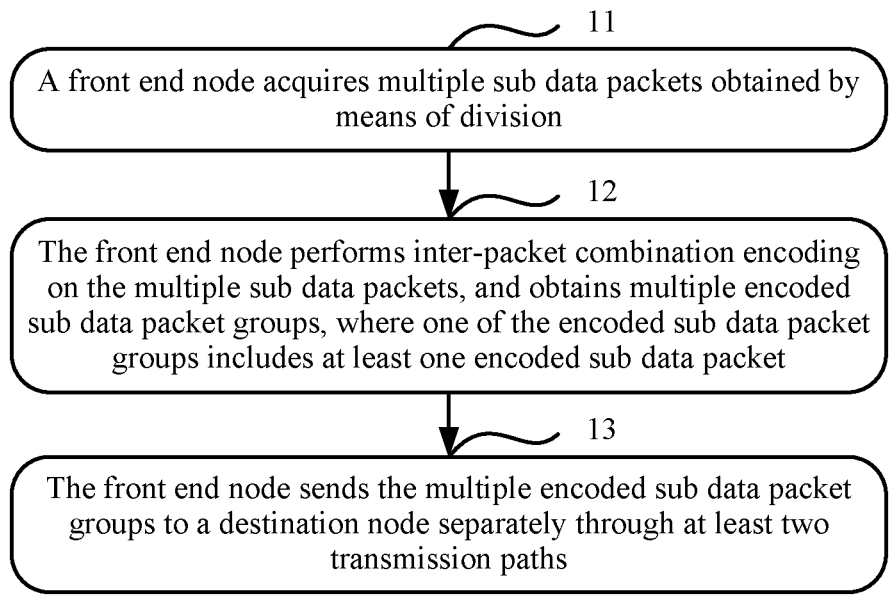
FIG. 1 is a schematic flowchart of steps of a data packet transmission method according to an embodiment of the present invention.

As shown in FIG. 1, FIG. 1 is a schematic flowchart of steps of a data packet transmission method according to an embodiment of the present invention, and a transmission process includes the following steps:

Step 11: A front end node acquires multiple sub data packets obtained by means of division.

The front end node in this embodiment of the present invention may be a node that performs combination encoding on a sub data packet, and the front end node may be a source node, may be an intermediate node, or may be a combination of a source node and an intermediate node; the present invention includes but is not limited thereto.

Step 12: The front end node performs inter-packet combination encoding on the multiple sub data packets, and obtains multiple encoded sub data packet groups, where one of the encoded sub data packet groups includes at least one encoded sub data packet.

Step 13: The front end node sends the multiple encoded sub data packet groups to a destination node separately through at least two transmission paths.

After the front end node sends the encoded sub data packet groups to the destination node, the destination node needs to receive the encoded sub data packet groups and parse out an original data packet. A schematic flowchart of specific steps is shown in FIG. 2, including the following steps:

Step 21: The destination node receives the encoded sub data packet groups sent by the front end node through multiple transmission paths.

Step 22: The destination node parses out the data packet according to the received encoded sub data packet groups and an obtained combination encoding mode, where each encoded sub data packet group is obtained after inter-packet combination encoding is performed on at least one sub data packet, and the sub data packet is obtained by dividing a data packet to be sent to the destination node.

Figure 2:
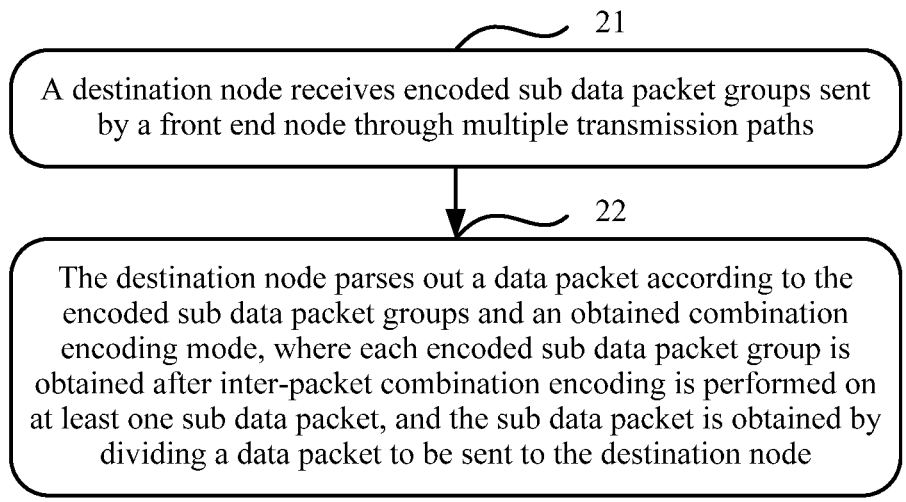
FIG. 2 is a schematic flowchart of steps of another data packet transmission method according to an embodiment of the present invention.

A process of transmitting a data packet from a front end node to a destination node may be implemented by using the methods shown in FIG. 1 and FIG. 2. The following separately describes in detail the methods shown in FIG. 1 and FIG. 2 according to different splitting scenarios.

Figure 3:
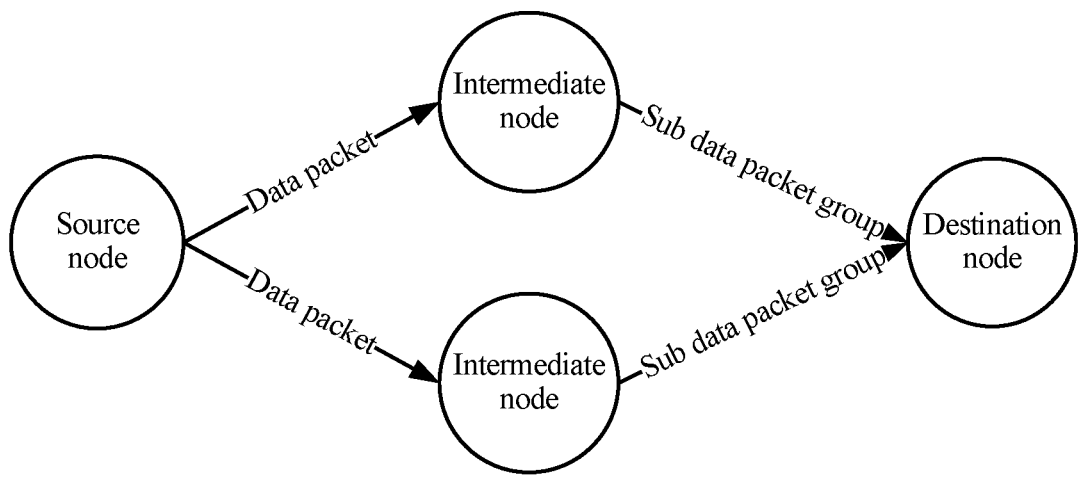
FIG. 3 is a schematic diagram of a sending scenario according to an embodiment of the present invention.
Figure 4A:
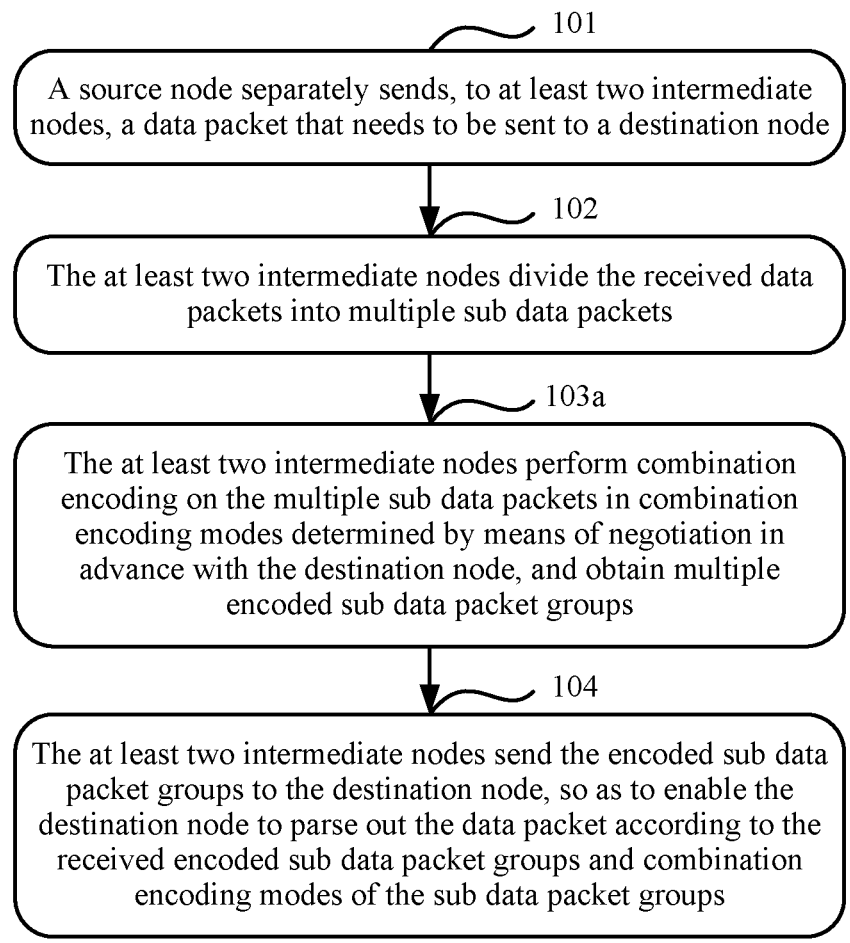
FIG. 4(a) and FIG. 4(b) are each a schematic diagram of a procedure for sending a data packet according to an embodiment of the present invention.
Figure 4B:
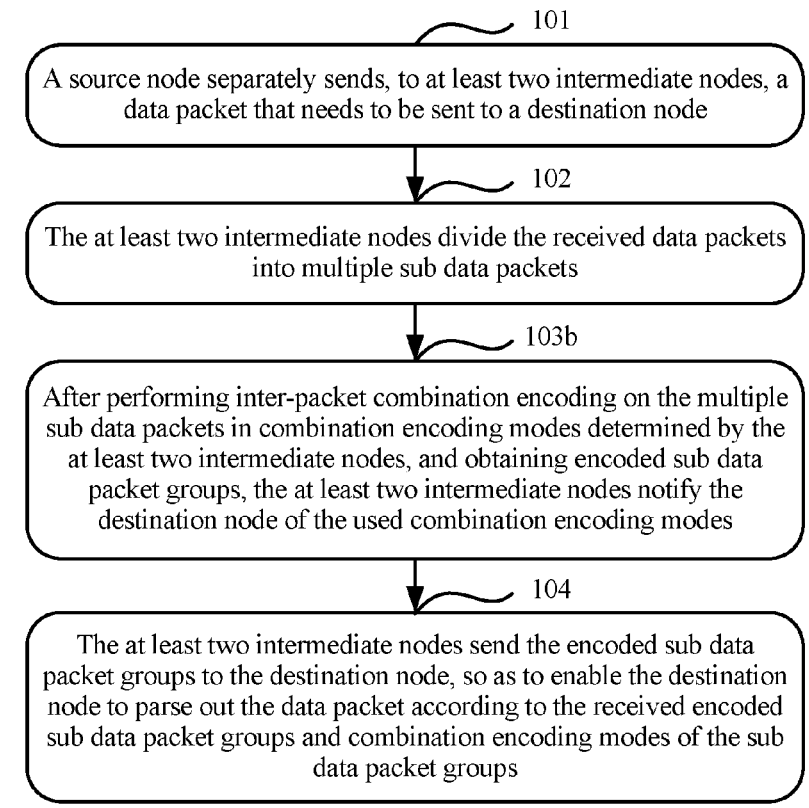

FIG. 3 describes an embodiment of a data packet splitting scenario. That the front end node is at least two intermediate nodes is used as an example for description in this embodiment, but the present invention includes but is not limited thereto. In the data packet splitting scenario shown in FIG. 3, a source node separately sends a data packet to at least two intermediate nodes, and after processing the data packet, the at least two intermediate nodes separately send encoded sub data packet groups to a destination node. As shown in FIGS. 4(a) and 4(b), a specific sending process includes the following steps:

Step 101: The source node separately sends, to the at least two intermediate nodes, the data packet that needs to be sent to the destination node.

For example, assuming that the source node is S, the destination node is D, the intermediate nodes are A and B, and the data packet that the source node S needs to send to the destination node D is M, a specific performing process of step 101 is as follows: The source node S separately sends the data packet M to the intermediate node A and the intermediate node B, so that the intermediate node A receives the data packet M, and the intermediate node B receives the data packet M.

Step 102: The at least two intermediate nodes divide the received data packets into multiple sub data packets.

Preferably, for convenience of subsequent combination encoding on and sending of the sub data packets, in step 102, the intermediate node may divide the received data packet into multiple sub data packets of a same size.

A specific performing process of step 102 is as follows: The intermediate node A divides the data packet M into n (n is a positive integer greater than 1) sub data packets of a same size. Similarly, the intermediate node B also divides the data packet M into n sub data packets of a same size.

Preferably, after obtaining the sub data packets by means of division, the intermediate node may notify, in a notification message form, the destination node of a division manner of the data packet and an identifier of each sub data packet obtained by means of division.

The division manner involved in this embodiment of the present invention may be information about a total quantity of sub data packets obtained by dividing an original data packet, and an identifier of each sub data packet may be denoted by using a serial number that is of each sub data packet obtained by means of division and that is in the original data packet, that is, a sequence number. Notifying the destination node of the division manner and the identifier of the sub data packet is to enable the destination node to combine all sub data packets into the original data packet in order when restoring the sub data packets by means of decoding.

Step 103: The at least two intermediate nodes perform combination encoding on the multiple sub data packets, and obtain multiple encoded sub data packet groups, where step 103 is implemented in the following manners:

Step 103a: The at least two intermediate nodes perform combination encoding on the multiple sub data packets in combination encoding modes determined by means of negotiation in advance with the destination node, and obtain the multiple encoded sub data packet groups; or step 103*b*: After performing inter-packet combination encoding on the multiple sub data packets in combination encoding modes determined by the at least two intermediate nodes, and obtaining the multiple encoded sub data packet groups, the at least two intermediate nodes notify the destination node of the used combination encoding modes.

One of the encoded sub data packet groups includes at least one sub data packet.

The inter-packet combination encoding may be performing combination and recoding on multiple sub data packets.

In step 103, the combination encoding mode used by the intermediate node may be a combination encoding mode determined by the intermediate node, and the combination encoding mode needs to be learned by the destination node, so that the destination node can perform parsing on the data packet in a corresponding decoding mode. Therefore, after obtaining the encoded sub data packet groups by performing combination encoding on the sub data packets, the intermediate node needs to notify the destination node of the combination encoding mode used by the intermediate node. Specifically, after performing inter-packet combination encoding in the combination encoding mode determined by the intermediate node in step 103, the intermediate node may notify the destination node of a combination encoding mode of each sub data packet group in a notification message form.

Optionally, in the following step 104, a header may be set in sub data packet groups to be sent to the destination node, where the header carries combination encoding modes of the sub data packet groups.

In addition to performing inter-packet combination encoding on the sub data packets in the combination encoding mode determined by the intermediate node, the intermediate node may perform inter-packet combination encoding on the sub data packets in the combination encoding mode determined by means of negotiation in advance with the destination node. In this case, the combination encoding mode used by the intermediate node is a combination encoding mode learned by the destination node, and therefore, the intermediate node does not need to additionally notify the destination node of the used combination encoding mode.

In step 103, the intermediate node may perform combination encoding on the sub data packets in any available inter-packet encoding mode, for example, perform encoding in a linear combination manner. In this embodiment of the present invention, a specific performing process of step 103 is described in detail by using the following three combination encoding modes as examples. The combination encoding modes are merely examples listed by the present invention; the present invention includes but is not limited thereto.

Combination Encoding Mode 1:

The intermediate node directly selects at least one sub data packet from the multiple sub data packets and combines the at least one sub data packet into an encoded sub data packet group.

For example, assuming that the intermediate node A divides the data packet M into three sub data packets that are respectively a sub data packet a, a sub data packet b, and a sub data packet c, and the intermediate node B also divides the data packet M into a sub data packet a, a sub data packet b, and a sub data packet c in a manner same as that of the intermediate node A, the intermediate node A and the intermediate node B may separately perform combination encoding in seven linear combination manners to obtain seven encoded sub data packet groups. Content of the seven encoded sub data packet groups is respectively a sub data packet a, a sub data packet b, a sub data packet c, sub data packets a+b, sub data packets a+c, sub data packets b+c, and sub data packets a+b+c.

Preferably, all intermediate nodes may separately perform combination encoding on the sub data packets in different manners, that is, linear combination manners used by all the intermediate node are orthogonal to each other, so that content of encoded sub data packet groups obtained by any two intermediate nodes by means of combination is different, and when the intermediate nodes send encoded sub data packet groups separately obtained by the intermediate nodes to the destination node, a case in which multiple intermediate nodes send same encoded sub data packet groups to the destination node does not occur, which avoids repeatedly sending encoded sub data packet groups that have same content, and reduces a sending quantity of the encoded sub data packet groups.

That the foregoing data packet M is divided into a sub data packet a, a sub data packet b, and a sub data packet c is still used as an example, and the intermediate node A may perform combination encoding in the following two linear combination manners. The two linear combination manners may include a linear combination manner in which only one sub data packet is selected and a linear combination manner in which all sub data packets are selected. The intermediate node A performs combination encoding in the foregoing two linear combination manners to obtain four encoded sub data packet groups, where content of the four encoded sub data packet groups is respectively a sub data packet a, a sub data packet b, a sub data packet c, and sub data packets a+b+c. After performing combination encoding in a linear combination manner in which some sub data packets are selected (but a quantity of selected sub data packets is greater than 1), the intermediate node B obtains three encoded sub data packet groups, where content of the three sub data packet groups is respectively sub data packets a+b, sub data packets a+c, and sub data packets b+c. In this case, encoding modes used by the intermediate node A and the intermediate node B are orthogonal to each other, and content of the obtained encoded sub data packet groups is different.

Combination Encoding Mode 2:

The intermediate node performs combination encoding by using a preset degree distribution function, and a specific process is as follows:

First, the intermediate node performs a random experiment by using the preset degree distribution function to determine a degree d of combination encoding, where the degree d indicates a maximum value of a quantity of sub data packets included in an encoded sub data packet group.

The preset degree distribution function may be notified by the source node to the intermediate node, may be determined by the intermediate node, may be determined by means of negotiation between the source node and the intermediate node, or may be determined by means of negotiation between the intermediate node and the destination node.

Figure 5:
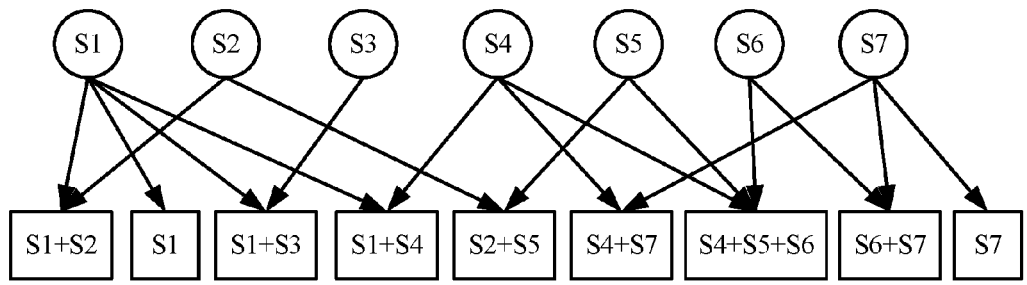
FIG. 5 is a schematic diagram of combination encoding performed by using a degree distribution function according to an embodiment of the present invention.

Next, the intermediate node randomly selects, from the sub data packets, sub data packets whose quantity is not greater than the degree d, and combines sub data packets selected each time into one encoded sub data packet group. A specific case is described as follows:

For example, assuming that the data packet M is divided by the intermediate node A into seven sub data packets, and is also divided by the intermediate node B into seven sub data packets in a manner same as that of the intermediate node A, the seven sub data packets are respectively a sub data packet S1 to a sub data packet S7, and a determined degree d is 3, the intermediate node A may randomly select three sub data packets or less than three sub data packets to combine them into an encoded sub data packet group. As shown in FIG. 5, FIG. 5 is a schematic diagram of nine encoded sub data packet groups obtained by the intermediate node A by means of combination. The intermediate node B may obtain multiple encoded sub data packet groups in a manner same as that of the intermediate node A, and details are not described herein again. Certainly, encoding modes used by the intermediate node A and the intermediate node B may be orthogonal to each other.

Combination Encoding Mode 3:

The intermediate node performs, by using a generator matrix that is negotiated in advance with the destination node or determined by the intermediate node, combination encoding on the sub data packets to generate encoded sub data packet groups. Manner 3 may be considered as an implementation manner of manner 1, that is, a combination manner of each sub data packet is reflected in a generator matrix form, so as to further perform combination on sub data packets.

For example, the generator matrix is shown as follows, and in this embodiment, sending three data packets x1, x2, and x3 is used as an example for description:

$$X = \begin{bmatrix} x_1 \\ x_2 \\ x_3 \end{bmatrix}$$

$$P = \begin{bmatrix} \hat{p}_1 \\ \hat{p}_2 \\ \hat{p}_3 \\ \vdots \\ \hat{p}_k \end{bmatrix} = \begin{bmatrix} p_{11} & p_{12} & p_{13} \\ p_{21} & p_{22} & p_{23} \\ p_{31} & p_{32} & p_{33} \\ \vdots & \vdots & \vdots \\ p_{k1} & p_{k2} & p_{k3} \end{bmatrix}$$

$$C = P * X$$

where, X is an original data packet group that includes three original sub data packets, which are respectively x1, x2, and x3; P is a generator matrix, where a row indicates a generation manner of each encoded sub data packet, and a column indicates a quantity of generated encoded sub data packets; and C is a sub data packet group obtained after encoding is completed.

For example, as described in the following, X may be an original data packet, P may be a generator matrix that is determined by means of negotiation with the destination node or determined by the intermediate node, and a sub data packet C acquired by using C=P*X is x1 x2, x3, x1+x3, and x1+x2+x3.

$$X = \begin{bmatrix} x_1 \\ x_2 \\ x_3 \end{bmatrix} P = \begin{bmatrix} \hat{p}_1 \\ \hat{p}_2 \\ \hat{p}_3 \\ \hat{p}_4 \\ \hat{p}_5 \end{bmatrix} = \begin{bmatrix} 1 & 0 & 0 \\ 0 & 1 & 0 \\ 0 & 0 & 1 \\ 1 & 0 & 1 \\ 1 & 1 & 1 \end{bmatrix}$$

The foregoing three combination encoding modes are merely examples listed by the present invention; the present invention includes but is not limited thereto.

Step 104: The at least two intermediate nodes send the multiple encoded sub data packet groups to the destination node, where further, the destination node parses out the data packet according to the received encoded sub data packet groups and combination encoding modes of the sub data packet groups.

Preferably, the intermediate node may add identifiers of each group of data packets in the encoded sub data packet groups to a header of the encoded sub data packet groups. The destination node identifies, according to the identifiers, that the received encoded sub data packet groups include which sub data packets.

Preferably, if a header of the encoded sub data packet groups sent by the intermediate node to the destination node carries an identifier of each sub data packet in the encoded sub data packet groups, the destination node may identify, according to the identifier of each sub data packet in the sub data packet groups, that the received encoded sub data packet groups include which sub data packets, and further determine how to restore the original data packet.

After the intermediate node sends the encoded sub data packet groups to the destination node, a process of sending the data packet is completed.

Figure 6A:
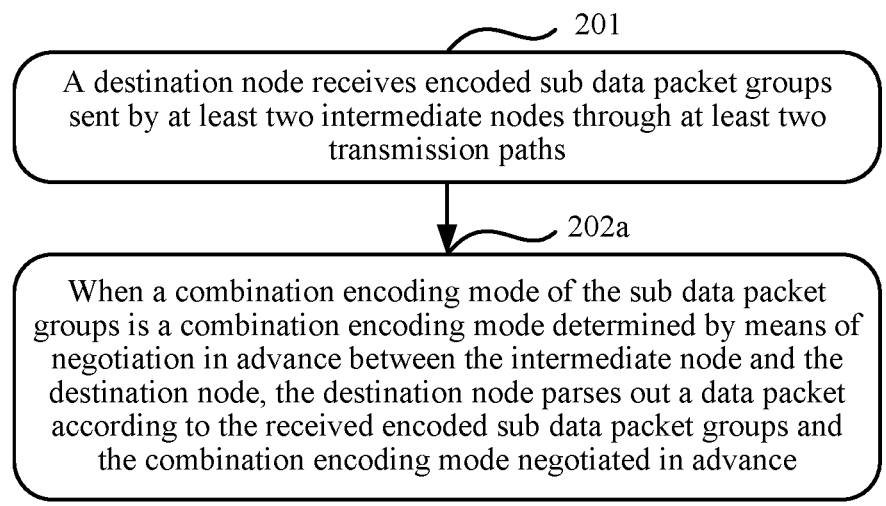
FIG. 6(a) and FIG. 6(b) are each a schematic diagram of a procedure for receiving a data packet according to an embodiment of the present invention.
Figure 6B:
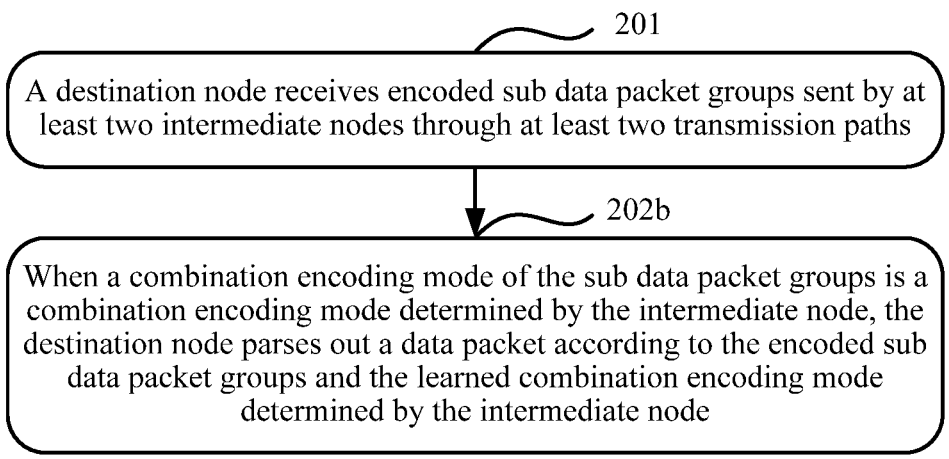

FIG. 6 is a schematic diagram of a procedure for receiving a data packet according to an embodiment of the present invention, and this embodiment may be used in combination with the embodiment shown in FIG. 4, or may be used independently. Referring to FIG. 6, this embodiment includes the following steps:

Step 201: A destination node receives encoded sub data packet groups sent by at least two intermediate nodes through at least two transmission paths.

The encoded sub data packet groups received in step 201 may be the encoded sub data packet groups that are sent, by performing step 104, after the data packet is processed according to the solutions of step 101 to step 103. Details are not described herein again.

Step 202: The destination node parses out the data packet according to the received encoded sub data packet groups and an obtained combination encoding mode, where step 202 may be specifically implemented in the following two manners:

Step 202*a*: When a combination encoding mode of the received encoded sub data packet groups is a combination encoding mode determined by means of negotiation in advance between the intermediate node and the destination node, the destination node parses out the data packet according to the received encoded sub data packet groups and the combination encoding mode negotiated in advance; or step 202*b*: When a combination encoding mode of the received encoded sub data packet groups is a combination encoding mode determined by the intermediate node, the destination node parses out the data packet according to the received encoded sub data packet groups and the learned combination encoding mode determined by the intermediate node.

In the solution of step 103, generally, the destination node may learn, by using an additional notification message, a combination encoding mode used by the intermediate node, or the destination node may obtain a combination encoding mode from a header of the received encoded sub data packet groups; and otherwise, the destination node may determine that a combination encoding mode of the received encoded sub data packet groups is a combination encoding mode determined by means of negotiation in advance. In step 202, the destination node may perform parsing on the received encoded sub data packet groups in a decoding mode corresponding to the combination encoding mode that is determined by means of negotiation in advance and used during encoding, so as to obtain the original data packet.

If in the solution of step 103, the intermediate node obtains the encoded sub data packet groups in the combination encoding mode determined by the intermediate node, the intermediate node may notify in advance the destination node of the used combination encoding mode in a notification message form, or add the used combination encoding mode to a header of the sent encoded sub data packet groups. Therefore, the destination node may determine a used decoding mode in step 202 according to the learned combination encoding mode, and perform parsing on the received encoded sub data packet groups to obtain the original data packet.

The following describes specific implementation processes of step 104, step 201, and step 202 by using examples, and details are as follows:

Assuming that an intermediate node A and an intermediate node B obtain multiple encoded sub data packet groups in combination encoding mode 1 negotiated in advance with a destination node D, in step 104, the intermediate node A and the intermediate node B may separately send the encoded sub data packet groups to the destination node D. For example, a network condition of the intermediate node A is better, and the intermediate node A sends two encoded sub data packet groups to the destination node D within a time period T, where content of the two encoded sub data packet groups is respectively a sub data packet a and sub data packets a+b; a network condition of the intermediate node B is poorer, and the intermediate node B sends only one encoded sub data packet group to the destination node D within the time period T, where content of the encoded sub data packet group is sub data packets b+c. In step 201, the destination node D receives the three encoded sub data packet groups sent by the intermediate node A and the intermediate node B, may parse out the sub data packet b after performing an exclusive OR operation for the sub data packet a and the sub data packets a+b, and then may parse out the sub data packet c after performing an exclusive OR operation manner for the sub data packet b and the sub data packets b+c. In this case, the destination node D restores the sub data packet a, the sub data packet b, and the sub data packet c, that is, parses out an original data packet M.

It should be noted that if currently received encoded sub data packet groups are still not enough to restore an original data packet, the destination node D needs to continue to receive more encoded sub data packet groups to restore the original data packet. A specific case is described as follows:

For example, an intermediate node A and an intermediate node B obtain multiple encoded sub data packet groups in combination encoding mode 1. The intermediate node A sends two encoded sub data packet groups to a destination node D within a time period T, where content of the two encoded sub data packet groups is a sub data packet a and sub data packets b+c; the intermediate node B sends one encoded sub data packet group to the destination node D within the time period T, where content of the encoded sub data packet group is sub data packets a+b+c. In this case, the destination node D can restore only the sub data packet a in an exclusive OR manner, but cannot restore the sub data packet b and the sub data packet c, that is, cannot parse out an original data packet M, and has to continue to receive encoded sub data packet groups sent by the intermediate node A and the intermediate node B to attempt to restore the sub data packet b and the sub data packet c.

For another example, an intermediate node A and an intermediate node B obtain multiple encoded sub data packet groups in combination encoding mode 2. The intermediate node A sends three encoded sub data packet groups to a destination node D within a time period T, where content of the three encoded sub data packet groups is respectively sub data packets S1+S2, a sub data packet S1, and sub data packets S1+S3; the intermediate node B also sends three encoded sub data packet groups to the destination node D within the time period T, where content of the three encoded sub data packet groups is respectively sub data packets S1+S4, sub data packets S2+S3, and sub data packets S4+S7. After receiving the six encoded sub data packet groups, the destination node D can restore only the sub data packet S1, the sub data packet S2, the sub data packet S3, the sub data packet S4, and the sub data packet S7, but cannot restore a sub data packet S5 and a sub data packet S6. Therefore, the destination node D needs to continue to receive encoded sub data packet groups sent by the intermediate node A and the intermediate node B.

Preferably, in step 202, after parsing out the data packet, the destination node may return a stop indication to the intermediate node, to require the intermediate node to stop sending the encoded sub data packet groups to the destination node.

A specific practice in which the destination node separately returns the stop indication to multiple intermediate nodes may be as follows: The destination node may maintain a shared channel with each intermediate node, and the destination node may separately return the stop indication to each intermediate node through the shared channel. After receiving the stop indication, the intermediate node stops sending the encoded sub data packet groups to the destination node, and a process of sending the data packet this time is completed.

The destination node returns the stop indication to the intermediate node only after parsing out the data packet, and does not perform processing before parsing out the data packet; therefore, a sending quantity of indication messages may be reduced, and network resources are further saved.

However, in an actual sending process, both a network condition of the intermediate node and a receiving status of the destination node are unpredictable. To prevent the intermediate node from unrestrictedly sending encoded sub data packet groups to the destination node, the intermediate node may determine, according to the network condition of the intermediate node, a maximum quantity of times of sending the encoded sub data packet groups to the destination node: A better network condition of the intermediate node means a larger determined maximum quantity of sending times. When a quantity of encoded sub data packet groups sent by the intermediate node to the destination node reaches the locally determined maximum quantity of sending times, if the intermediate node does not yet receive the stop indication returned by the destination node, the intermediate node stops sending the encoded sub data packet groups to the destination node, and may notify, in a manner of sending an event message to a source node, that sending the data packet fails this time.

In the method of this embodiment of the present invention, the intermediate node may be a network device such as an eNodeB (eNodeB), a wireless access point (AP), or a gateway; or may be a network device in a core network, such as a serving GPRS support node (SGSN), a packet data network gateway (P-GW), or a serving gateway (S-GW); the present invention includes but is not limited thereto.

Figure 7:
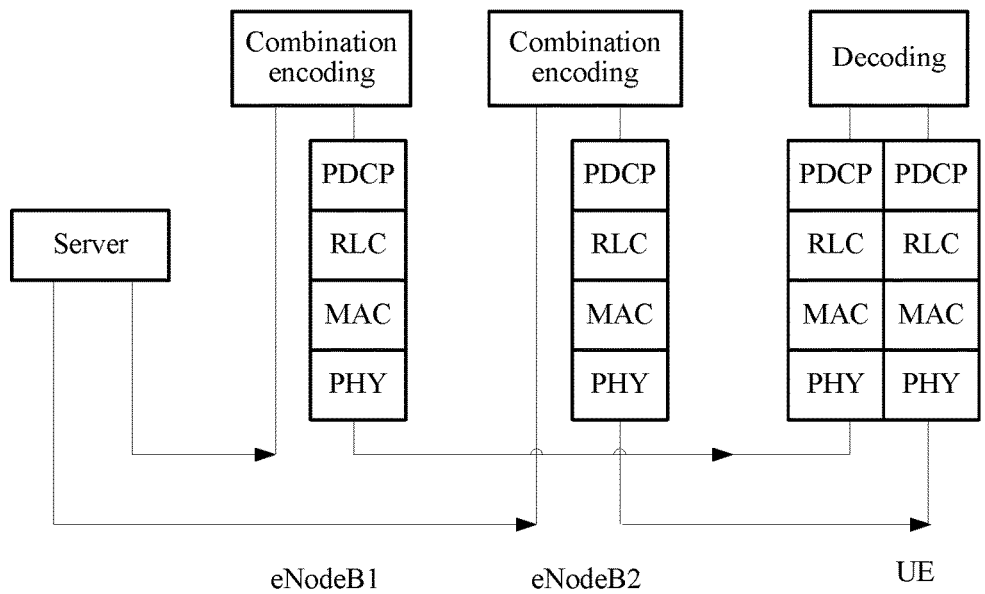
FIG. 7 is a schematic diagram of a sending scenario in which an LTE network architecture is used as an example according to an embodiment of the present invention.

A case in which this embodiment of the present invention is implemented in an LTE network architecture is used as an example. As shown in FIG. 7, assuming that a source node S, an intermediate node A, and an intermediate node B are respectively a server, an eNodeB1, and an eNodeB2, and the destination node is UE, the intermediate node A and the intermediate node B may have a combination encoding capability at a Packet Data Convergence Protocol (Packet Data Convergence Protocol, PDCP) layer, may execute functions of step 102 to step 104 in the embodiment, and then send encoded sub data packet groups to the destination node separately through a local PDCH layer, a Radio Link Control (Radio Link Control, RLC) layer, a Media Access Control (Media Access Control, MAC) layer, and a physical (PHY) layer. The destination node may have a combination decoding capability at a PDCP layer, is configured to execute functions of step 201 and step 202 in the embodiment, and after the encoded sub data packet groups separately pass through a PHY layer, a MAC layer, an RLC layer, and a PDCP layer in the destination node, performs parsing to obtain an original data packet.

Figure 8:
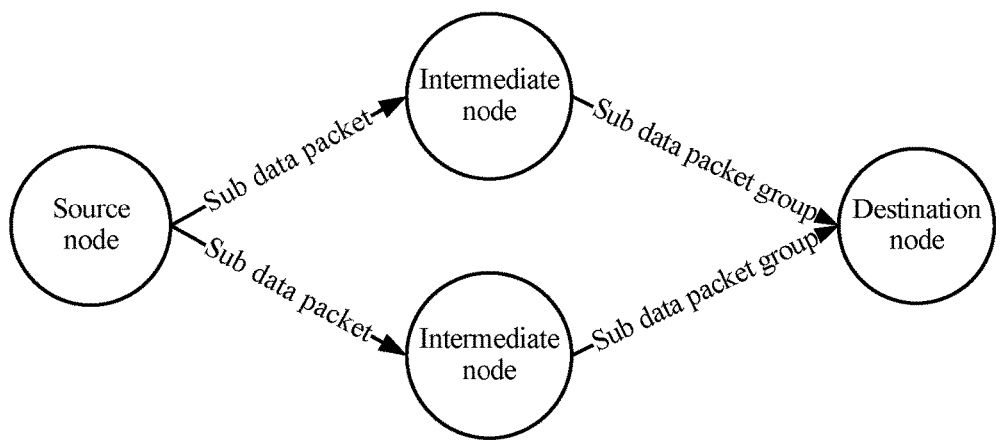
FIG. 8 is a schematic diagram of another sending scenario according to an embodiment of the present invention.
Figure 9A:
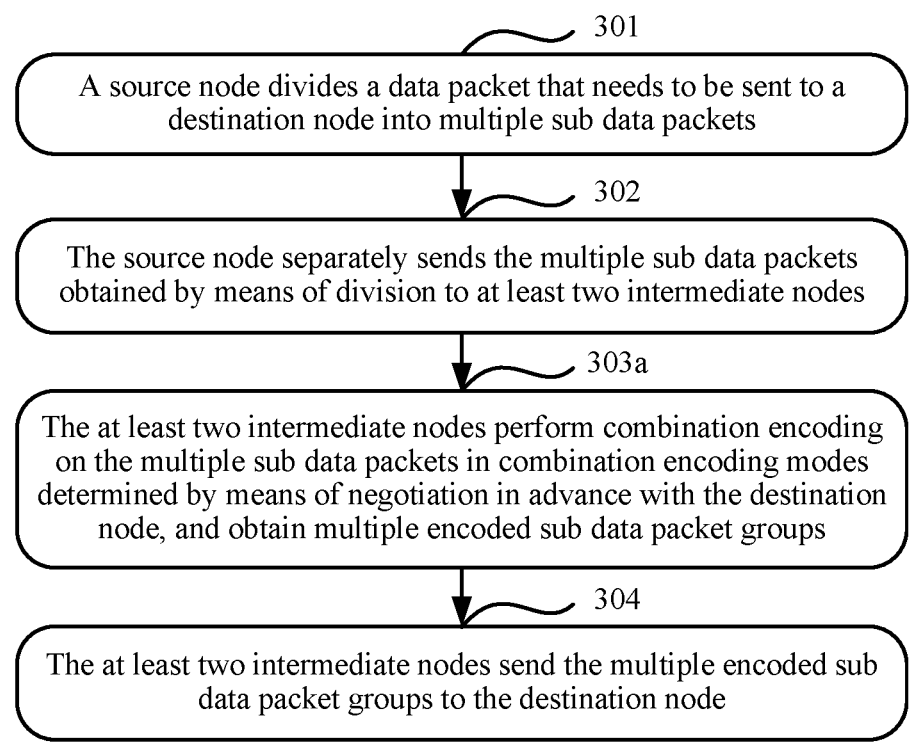
FIG. 9(a) and FIG. 9(b) are each a schematic diagram of another procedure for sending a data packet according to an embodiment of the present invention.
Figure 9B:
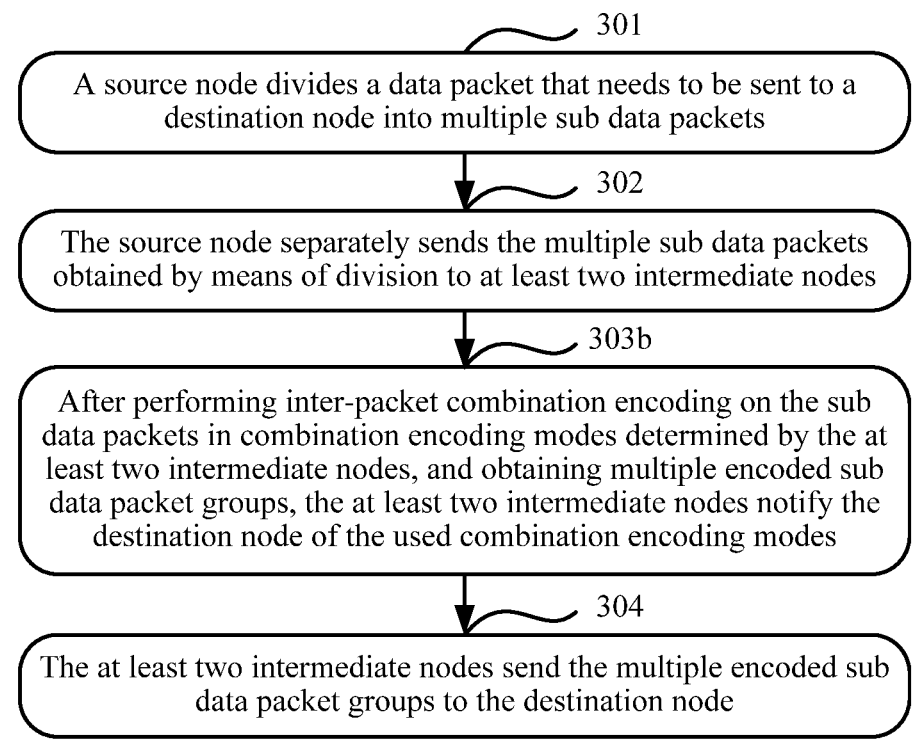

Referring to FIG. 8, an embodiment of the present invention further describes a method for sending a data packet based on a scenario shown in FIG. 8, and a difference from the case shown in FIG. 3 is as follows: The front end node includes at least two intermediate nodes; a source node separately sends, after dividing a data packet that needs to be sent to a destination node into multiple sub data packets, the multiple sub data packets obtained by means of division to the at least two intermediate nodes; and the at least two intermediate nodes send encoded sub data packet groups to the destination node after performing processing on the sub data packets in a manner same as those of step 103 and step 104. A specific sending process is shown in FIG. 9, including the following steps:

Step 301: The source node divides a data packet that needs to be sent to the destination node into multiple sub data packets.

Preferably, for convenience of subsequent combination encoding on the sub data packets and sending of a sub data packet group obtained by means of combination encoding, the source node may divide the data packet into multiple sub data packets of a same size.

Step 302: The source node separately sends the multiple sub data packets obtained by means of division to the at least two intermediate nodes.

Step 303: The at least two intermediate nodes perform combination encoding on the multiple sub data packets, and obtain multiple encoded sub data packet groups, where step 303 may specifically include two manners:

Step 303a: The at least two intermediate nodes perform combination encoding on the multiple sub data packets in combination encoding modes determined by means of negotiation in advance with the destination node, and obtain the multiple encoded sub data packet groups; or step 303b: After performing inter-packet combination encoding on the multiple sub data packets in combination encoding modes determined by the at least two intermediate nodes, and obtaining the multiple encoded sub data packet groups, the at least two intermediate nodes notify the destination node of the used combination encoding modes.

One of the encoded sub data packet groups includes at least one sub data packet.

A specific implementation manner of step 303 is the same as that of step 103, and details are not described herein again.

Step 304: The at least two intermediate nodes send the multiple encoded sub data packet groups to the destination node.

A specific implementation manner of step 304 is the same as that of step 104, and details are not described herein again.

After the at least two intermediate nodes send the encoded sub data packet groups to the destination node, a process of sending the data packet is completed. Further, this embodiment may further include a procedure for receiving a data packet, that is, a procedure for sending a data packet and a procedure for receiving a data packet may be used separately, or may be used in combination; the present invention includes but is not limited to the foregoing listed examples. In this embodiment, a process in which the destination node receives the encoded sub data packet groups and parses out the data packet is the same as that of step 201 and step 202, and details are not described herein again.

Figure 10:
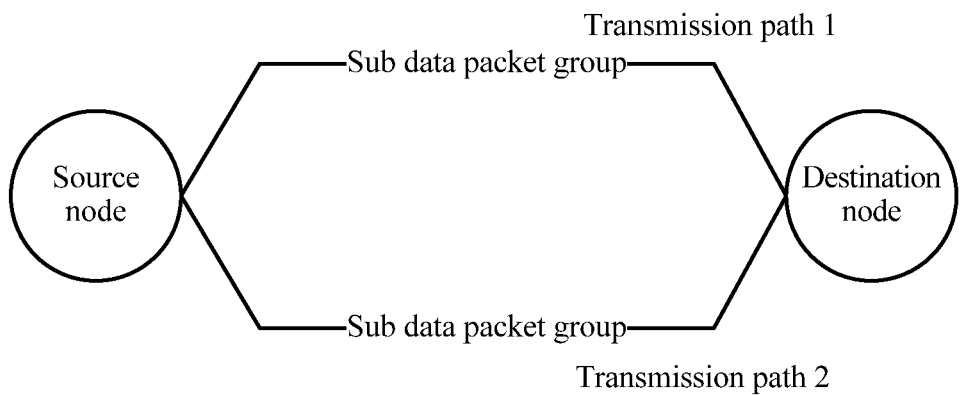
FIG. 10 is a schematic diagram of another sending scenario according to an embodiment of the present invention.
Figure 11A:
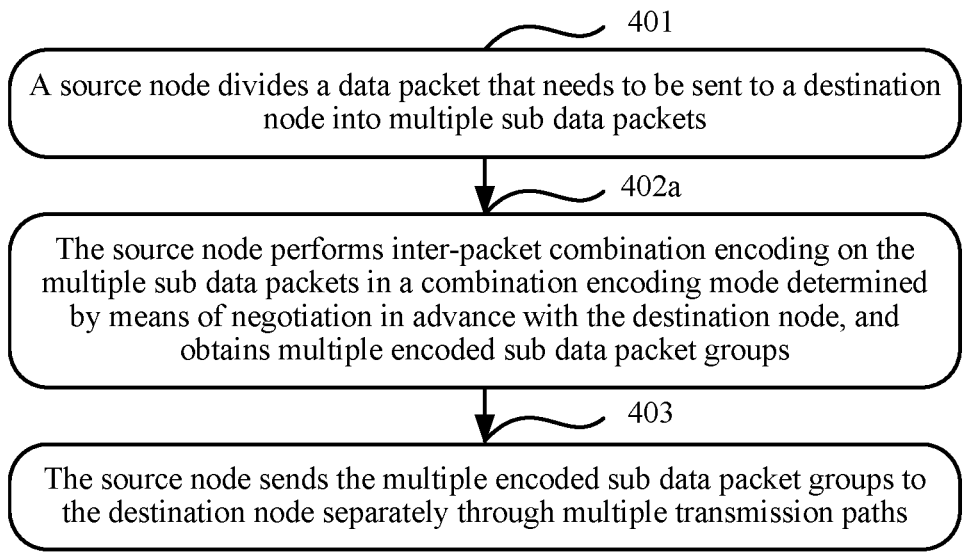
FIG. 11(a) and FIG. 11(b) are each a schematic diagram of another procedure for sending a data packet according to an embodiment of the present invention.
Figure 11B:
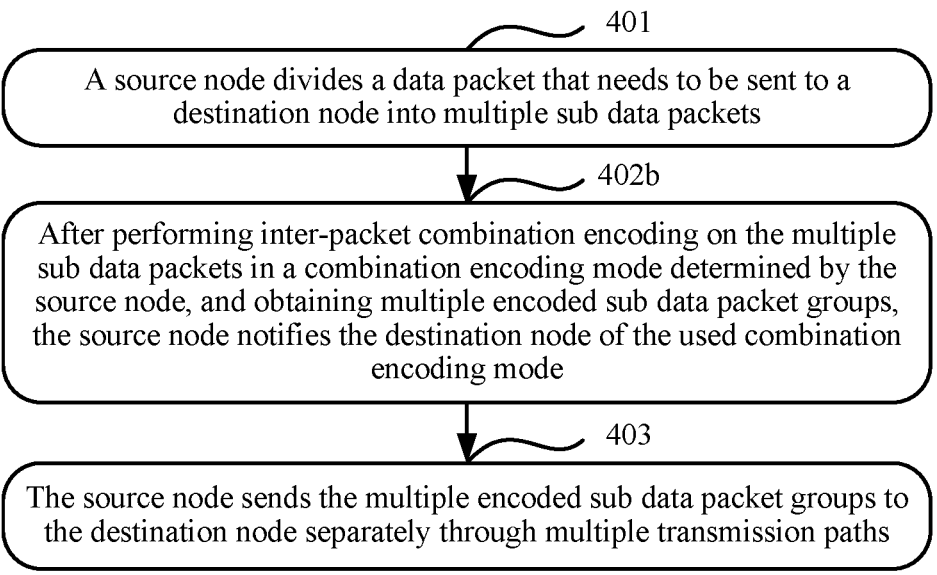

Referring to FIG. 10, an embodiment of the present invention further describes an embodiment of sending a data packet based on a scenario shown in FIG. 10, and a difference from the cases shown in FIG. 3 and FIG. 8 is as follows: The front end node is a source node, and after performing combination encoding processing on sub data packets obtained by means of division, the source node sends encoded sub data packet groups to a destination node separately through multiple transmission paths. A specific sending process is shown in FIG. 11, including the following steps:

Step 401: The source node divides a data packet that needs to be sent to the destination node into multiple sub data packets.

Preferably, for convenience of subsequent combination encoding on the sub data packets and sending of a data packet obtained by means of combination encoding, in step 401, the source node may divide the data packet that needs to be sent into multiple sub data packets of a same size.

For example, assuming that the source node is S, the destination node is D, and the data packet that the source node S needs to send to the destination node D is M, a specific performing process of step 401 is as follows: The source node S divides the data packet M into n sub data packets of a same size.

Step 402: The source node performs combination encoding on the multiple sub data packets, and obtains multiple encoded sub data packet groups, where step 402 may include two manners:

Step 402a: The source node performs inter-packet combination encoding on the multiple sub data packets in a combination encoding mode determined by means of negotiation in advance with the destination node, and obtains the multiple encoded sub data packet groups; or step 402b: After performing inter-packet combination encoding on the multiple sub data packets in a combination encoding mode determined by the source node, and obtaining the multiple encoded sub data packet groups, the source node notifies the destination node of the used combination encoding mode.

One of the encoded sub data packet groups includes at least one sub data packet.

In step 402, the combination encoding mode used by the source node may be a combination encoding mode determined by the source node, and the combination encoding mode needs to be learned by the destination node, so that the destination node can perform parsing on the data packet in a corresponding decoding mode. Therefore, after obtaining the encoded sub data packet groups by performing combination encoding on the sub data packets, the source node needs to notify the destination node of the combination encoding mode used by the source node. Specifically, the source node may notify the destination node of a combination encoding mode of each sub data packet group in a notification message form after performing inter-packet combination encoding in the combination encoding mode determined by the source node in step 402; or may set, in the following step 403, a header in the sub data packet groups sent to the destination node, and add combination encoding modes of the sub data packet groups to the header.

In addition to performing inter-packet combination encoding on the sub data packets in the combination encoding mode determined by the source node, the source node may perform inter-packet combination encoding on the sub data packets in the combination encoding mode determined by means of negotiation in advance with the destination node. In this case, the combination encoding mode used by the source node is a combination encoding mode learned by the destination node, and therefore, the source node does not need to additionally notify the destination node of the used combination encoding mode.

The source node may perform combination encoding in the three combination encoding modes described in step 103.

Step 403: The source node sends the multiple encoded sub data packet groups to the destination node separately through multiple transmission paths, where in a transmission process, an intermediate node forwards the sub data packet groups obtained after the source node performs combination encoding, and does not need to perform combination encoding on the sub data packets again.

Preferably, if the header of the encoded sub data packet groups sent by the source node to the destination node carries an identifier of each sub data packet in the encoded sub data packet groups, the destination node may identify that the received encoded sub data packet groups include which sub data packets, and further determine how to restore an original data packet.

Figure 12:
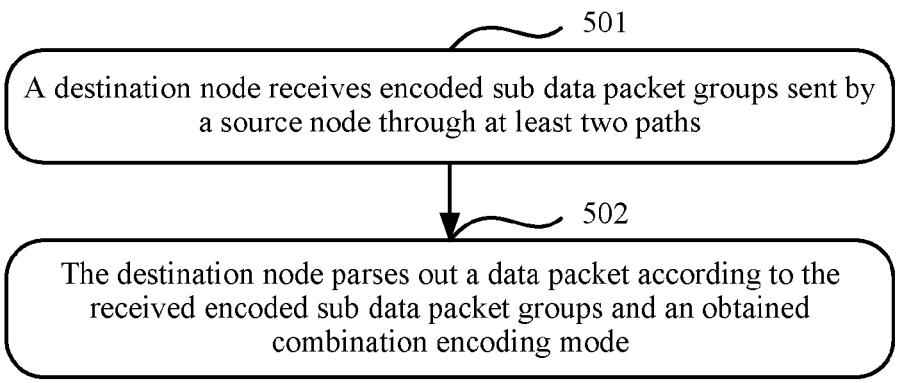
FIG. 12 is a schematic diagram of another procedure for receiving a data packet according to an embodiment of the present invention.

FIG. 12 is a schematic diagram of a procedure for receiving a data packet according to an embodiment of the present invention, and this embodiment may be used in combination with the embodiment shown in FIG. 11, or may be used independently. Referring to FIG. 12, this embodiment includes the following steps:

Step 501: A destination node receives encoded sub data packet groups sent by a source node through at least two paths.

Step 502: The destination node parses out the data packet according to the received encoded sub data packet groups and an obtained combination encoding mode.

If in the solution of step 402, generally, the destination node may learn, by using an additional notification message, a combination encoding mode used by the source node, or the destination node may obtain a combination encoding mode in a header of the received encoded sub data packet groups; and otherwise, if the destination node does not learn a combination encoding mode by using an additional notification message, or does not obtain a combination encoding mode in a header of the received encoded sub data packet groups, it may be determined that a combination encoding mode determined by means of negotiation in advance is used for the received encoded sub data packet groups. In step 502, the destination node may perform parsing on the received encoded sub data packet groups in a decoding mode corresponding to the combination encoding mode determined by means of negotiation in advance, and obtain the original data packet.

If in the solution of step 402, the source node obtains the encoded sub data packet groups in the combination encoding mode determined by the source node, the source node may notify in advance the destination node of the used combination encoding mode in a notification message form, or add the used combination encoding mode to a header of the sent encoded sub data packet groups. Therefore, in step 502, the destination node may perform parsing on the received encoded sub data packet groups in a decoding mode corresponding to the learned combination encoding mode, and obtain the original data packet.

The following describes specific implementation processes of step 403, step 501, and step 502 by using examples:

Assuming that a source node S obtains multiple encoded sub data packet groups in combination encoding mode 1 negotiated in advance with a destination node D, the source node S may send the encoded sub data packet groups to the destination node separately through two transmission paths (referred to as a transmission path 1 and a transmission path 2) in step 403. Specifically, the source node S may allocate, according to a channel state of each transmission path, the obtained encoded sub data packet groups to each transmission path in a proportion. For example, more encoded sub data packet groups are carried on a transmission path of which a channel state is better, and less encoded sub data packet groups are carried on a transmission path of which a channel state is poorer.

Preferably, in step 403, when sending the multiple encoded sub data packet groups to the destination node through the multiple transmission paths, the source node may separately send different encoded sub data packet groups on different transmission paths, that is, linear combination manners of encoded sub data packet groups sent on any two transmission paths are orthogonal to each other. An advantage by doing this is as follows: Because content of encoded sub data packet groups sent on any two transmission paths is different, a case in which same encoded sub data packet groups are sent to the destination node through multiple transmission paths does not occur, which avoids repeatedly sending encoded sub data packet groups that have same content, and reduces a sending quantity of the encoded sub data packet groups.

Preferably, in step 502, after parsing out the data packet, the destination node may return a stop indication to the source node, to require the source node to stop sending the encoded sub data packet groups to the destination node, and after receiving the stop indication, the source node stops sending the encoded sub data packet groups to the destination node; a process of sending the data packet this time is completed.

Preferably, the source node may determine, according to a network condition of the source node, a maximum quantity of sending times of sending the encoded sub data packet groups to the destination node: A better network condition of the source node means a larger determined maximum quantity of sending times. If the stop indication returned by the destination node is still not received when a quantity of encoded sub data packet groups sent by the source node to the destination node reaches the maximum quantity of sending times, the source node stops sending the encoded sub data packet groups to the destination node, and determines that sending the data packet fails this time.

In the method of this embodiment of the present invention, the source node may be a network device, such as an eNodeB, an AP, or a gateway; or may be a network device in a core network, such as an SGSN, a P-GW, or an S-GW. An intermediate node involved in the embodiments may be included on a transmission path that is used for sending the encoded sub data packet groups, but in the solution of this embodiment, an intermediate node is only configured to forward the encoded sub data packet groups, but does not perform combination encoding processing on the encoded sub data packet groups.

Figure 13:
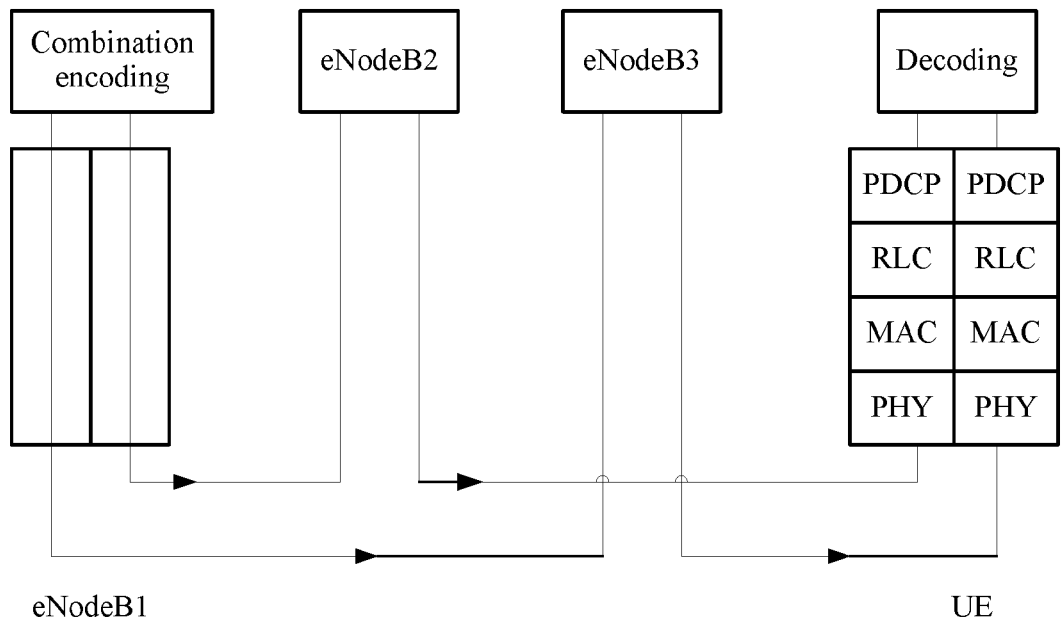
FIG. 13 and FIG. 14 are schematic diagrams of two sending scenarios in which an LTE network architecture is used as an example according to an embodiment of the present invention.

A case in which this embodiment of the present invention is implemented in an LTE network architecture is used as an example. As shown in FIG. 13, assuming that the source node is an eNodeB1, the destination node is UE, and there are respectively an eNodeB2 and an eNodeB3 on two transmission paths that are used for sending the encoded sub data packet groups, in this case, the eNodeB2 and the eNodeB3 do not perform additional processing, but are configured to perform forwarding merely. The destination node may have a combination decoding capability at a PDCP layer, is configured to execute functions of step 501 and step 502 in this embodiment, and after the encoded sub data packet groups separately pass through a PHY layer, a MAC layer, an RLC layer, and a PDCP layer in the destination node, performs parsing to obtain an original data packet.

Figure 14:
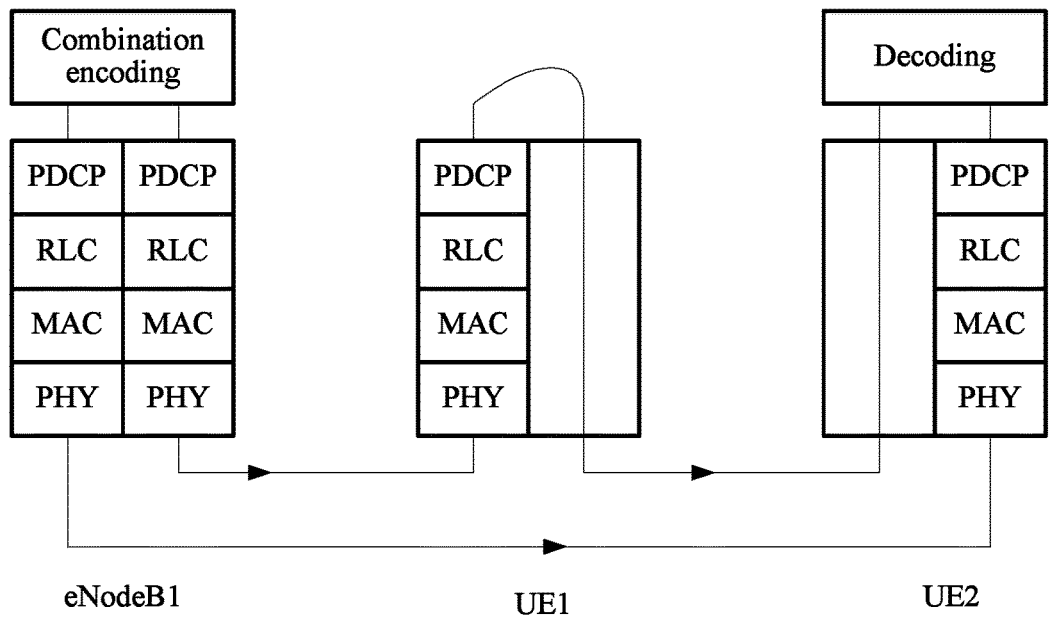

Further, as shown in FIG. 14, assuming that the source node is an eNodeB1, UE1 is an intermediate node, and the destination node is UE2, two transmission paths used for sending the encoded sub data packet groups are respectively as follows: The source node directly sends the sub data packet groups to the destination node UE2, and the source node sends the sub data packet groups to the destination node UE2 by using the intermediate node UE1 (the sub data packet groups may be forwarded between the UE1 and the UE2 by using a short-range communications technology such as Bluetooth and ZigBee). A service shown in FIG. 14 may be applied to an MUCC scenario, that is, if the eNodeB1 cannot directly communicate with the UE2, indirect communication between the eNodeB1 and the UE2 may be implemented by using the UE1.

Figure 15:
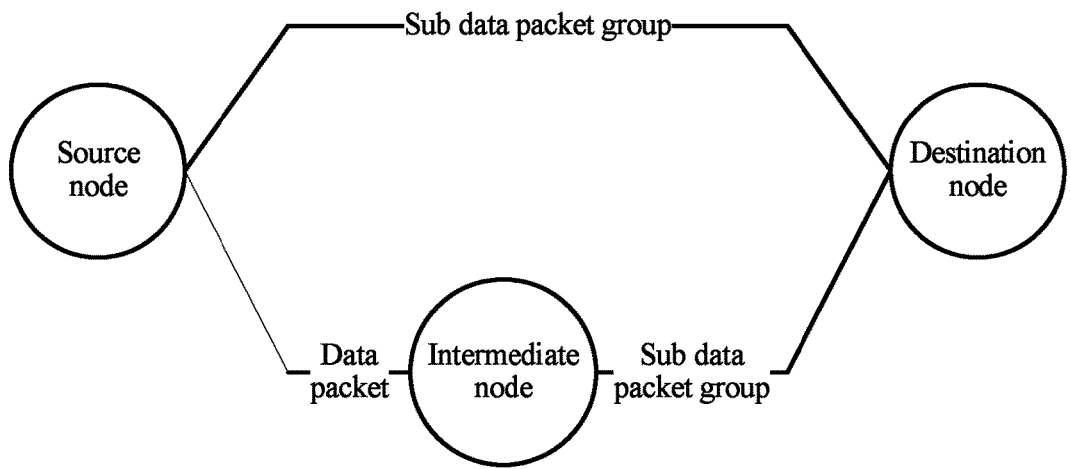
FIG. 15 is a schematic diagram of a fourth sending scenario according to an embodiment of the present invention.
Figure 16A:
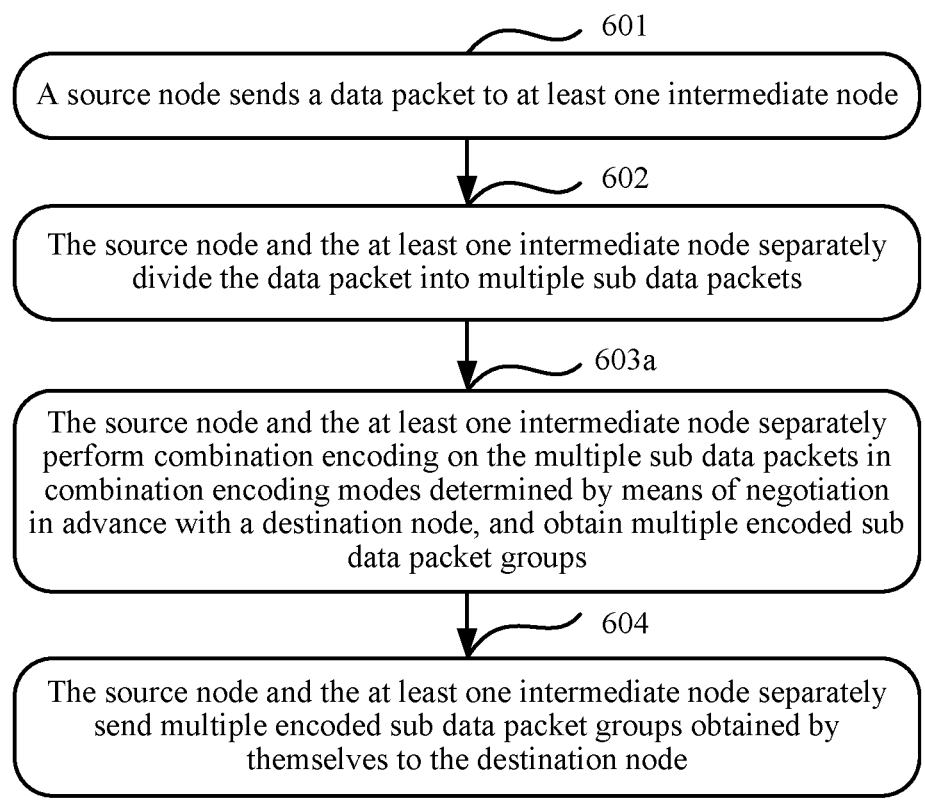
FIG. 16(a) and FIG. 16(b) are each a schematic diagram of a fourth procedure for sending a data packet according to an embodiment of the present invention.
Figure 16B:
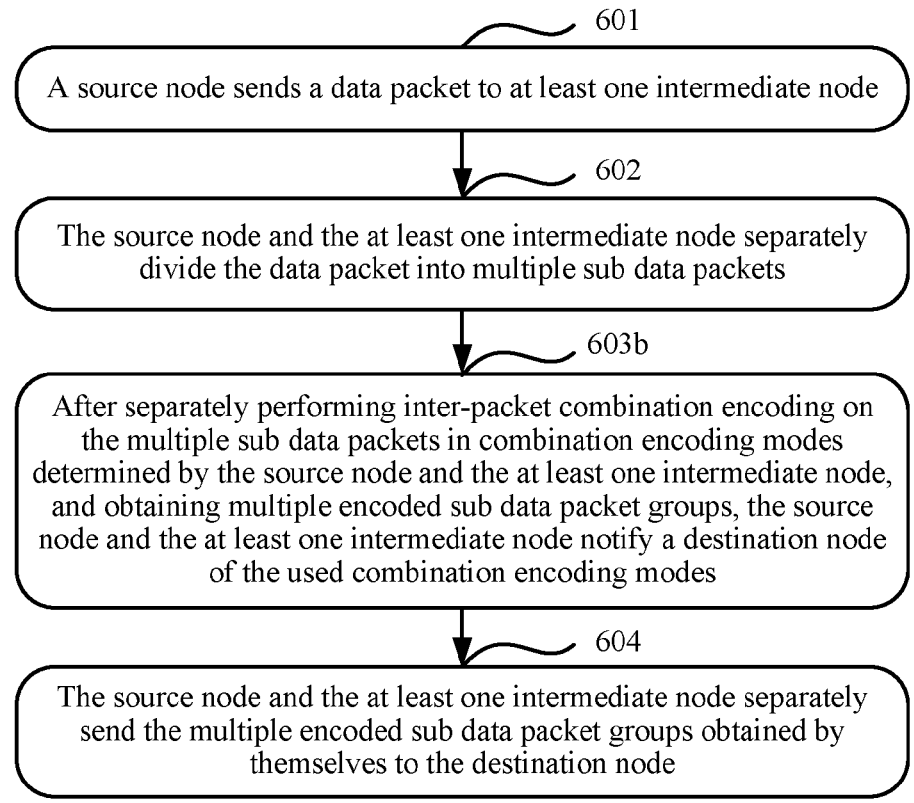

Referring to FIG. 15, an embodiment of the present invention further describes an embodiment of sending a data packet based on a scenario shown in FIG. 15, and a difference from the cases shown in FIG. 3, FIG. 8, and FIG. 10 is as follows: The front end node is a source node and at least one intermediate node, and after separately performing combination encoding processing on sub data packets obtained by means of division, the source node and the at least one intermediate node separately send encoded sub data packet groups to a destination node. A specific sending process is shown in FIG. 16, including the following steps:

Step 601: The source node sends a data packet to the at least one intermediate node.

Step 602: The source node and the at least one intermediate node separately divide the data packet into multiple sub data packets.

Step 603: The source node and the at least one intermediate node separately perform inter-packet combination encoding on the multiple sub data packets, and obtain multiple encoded sub data packet groups, where two manners are specifically included:

Step 603a: The source node and the at least one intermediate node separately perform combination encoding on the multiple sub data packets in combination encoding modes determined by means of negotiation in advance with the destination node, and obtain the multiple encoded sub data packet groups; or step 603b: After separately performing inter-packet combination encoding on the multiple sub data packets in combination encoding modes determined by the source node and the at least one intermediate node, and obtaining the multiple encoded sub data packet groups, the source node and the at least one intermediate node notify the destination node of the used combination encoding modes.

One of the encoded sub data packet groups includes at least one encoded sub data packet.

Specifically, the source node may perform inter-packet combination encoding on the sub data packets in the manner described in step 402, and the at least one intermediate node may perform inter-packet combination encoding on the sub data packets in the manner described in step 103.

The source node and the at least one intermediate node may separately perform a combination encoding operation in the three combination encoding modes involved in step 103.

Step 604: The source node and the at least one intermediate node separately send the multiple encoded sub data packet groups obtained by themselves to the destination node, so that the destination node parses out the data packet according to the received encoded sub data packet groups and combination encoding modes of the sub data packet groups.

After the intermediate node and the source node separately send the encoded sub data packet groups to the destination node, a process of sending the data packet is completed, and then a procedure for receiving the data packet is performed, where the procedure is similar to that in the embodiment shown in FIG. 12. Details are not described herein again.

Figure 17:
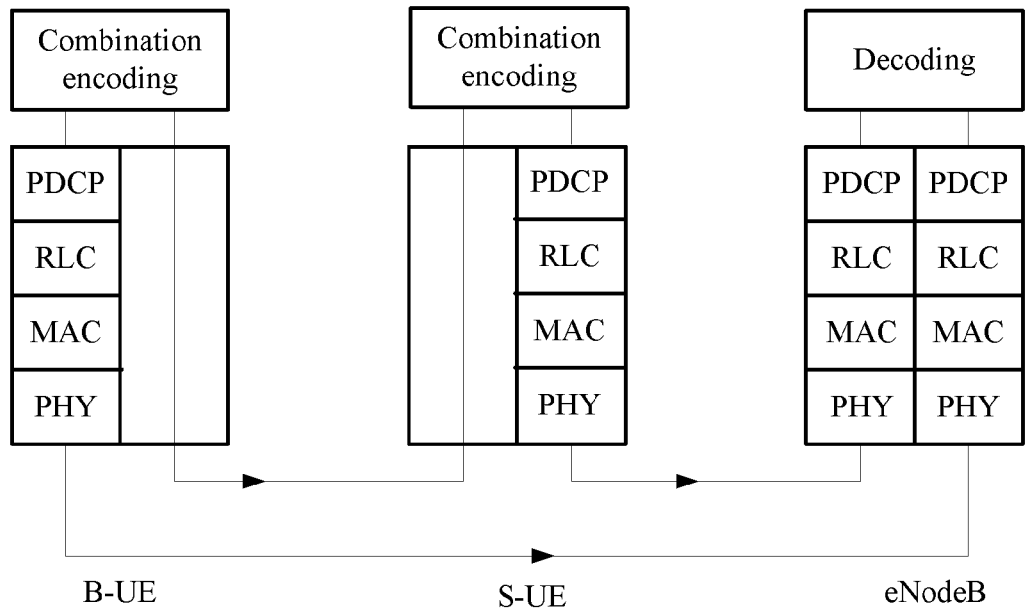
FIG. 17 is a schematic diagram of a sending scenario in which an LTE network architecture is used as an example according to an embodiment of the present invention.

The foregoing solution shown in FIG. 16 may be applied to multiple UE cooperative communication (MUCC), and when selecting a supporting user equipment (S-UE, that is, the intermediate node in this embodiment) for benefitted UE (B-UE, that is, the source node in this embodiment) to forward a part of data for the benefitted UE, a network side may use the method of this embodiment of the present invention at an MUCC layer. As shown in FIG. 17, assuming that the source node is B-UE, the intermediate node is S-UE, and the destination node is an eNodeB, after separately performing encoding on sub data packets, the source node B-UE and the intermediate node S-UE obtain encode sub data packet groups, and separately send the encode sub data packet groups to the destination node eNodeB.

Figure 18A:
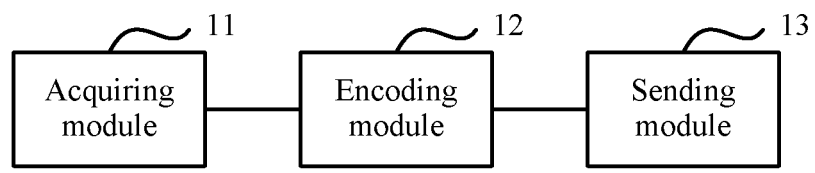
FIG. 18(a) to FIG. 18(c) are each a schematic structural diagram of a data packet transmission device according to an embodiment of the present invention.

An embodiment of the present invention describes a data packet transmission device, and the device may implement a function of the front end node in step 11 to step 13 shown in FIG. 1, where a description is as follows:

Referring to FIG. 18(a), the device includes an acquiring module 11, an encoding module 12 connected to the acquiring module 11, and a sending module 13 connected to the encoding module 12, where:

the acquiring module 11 is configured to acquire multiple sub data packets obtained by means of division;

the encoding module 12 is configured to: perform inter-packet combination encoding on the multiple sub data packets acquired by the acquiring module 11, and obtain multiple encoded sub data packet groups, where one of the encoded sub data packet groups includes at least one encoded sub data packet; and the sending module 13 is configured to send, separately through at least two transmission paths, the multiple sub data packet groups obtained by the encoding module 12 to a destination node.

As a front end node, the device may be a source node, may be an intermediate node, or may be a combination of a source node and an intermediate node. Certainly, the several types of devices are merely examples listed by the present invention, and the present invention includes but is not limited thereto. The following separately uses three cases in which the front end node is a source node, an intermediate node, or a combination of a source node and an intermediate node as examples for description.

When the device is an intermediate node, if the device implements a function of the intermediate node in step 101 to step 104 shown in FIG. 4 or a function of the intermediate node in step 601 to step 604 shown in FIG. 16, the acquiring module 11 is specifically configured to: receive a data packet from a source node, and divide the received data packet into multiple sub data packets; if the device implements a function of the intermediate node in step 301 to step 304 shown in FIG. 9, the acquiring module 11 is specifically configured to receive multiple sub data packets sent by a source node, where the multiple sub data packets are obtained after the source node divides a data packet.

When the device is a source node, that is, when the device may implement a function of the source node in step 401 to step 403 shown in FIG. 11, the acquiring module 11 is specifically configured to divide a data packet into multiple sub data packets.

Further, referring to FIG. 18(*b*), the encoding module 12 specifically includes an encoding mode determining submodule 12*a* and a combination encoding submodule 12*b*, where:

the encoding mode determining submodule 12*a* is configured to: determine a combination encoding mode by means of negotiation in advance with the destination node, or determine a combination encoding mode by the encoding mode determining submodule 12*a* and notify the destination node of the used combination encoding mode; and the combination encoding submodule 12*b* is configured to: perform inter-packet combination encoding on the multiple sub data packets in the combination encoding mode determined by the encoding mode determining submodule 12*a*, and obtain the multiple encoded sub data packet groups.

Further, the combination encoding mode determined by the encoding mode determining submodule 12*a* is a linear combination manner; and the combination encoding submodule 12*b* is specifically configured to: select, in the linear combination manner determined by the encoding mode determining submodule 12*a*, at least one sub data packet from the multiple sub data packets to perform combination encoding, so as to acquire an encoded sub data packet group.

Further, the combination encoding submodule 12*b* is specifically configured to: determine a degree of combination encoding by using a degree distribution function determined by the encoding mode determining submodule 12*a*, randomly select sub data packets whose quantity is not greater than the degree from the sub data packets, and combine sub data packets selected each time into one encoded sub data packet group; or is configured to perform, by using a generator matrix determined by the encoding mode determining submodule 12*a*, combination encoding on the sub data packets to generate encoded sub data packet groups.

Further, when the device is the intermediate node in steps shown in FIG. 4, FIG. 9 or FIG. 16, the combination encoding submodule 12*b* is specifically configured to select, in the linear combination manner determined by the encoding mode determining submodule 12*a*, at least one sub data packet from the multiple sub data packets to perform orthogonalization on linear combination manners, so that content of encoded sub data packet groups obtained by any two intermediate nodes is different.

Further, when the device is the source node in steps shown in FIG. 11, the sending module 13 is specifically configured to send the multiple encoded sub data packet groups to the destination node through the at least two transmission paths, where linear combination manners of the encoded sub data packet groups sent on the transmission paths are orthogonal to each other, so that content of the encoded sub data packet groups sent on the two transmission paths is different.

Further, referring to FIG. 18(*c*), the device further includes a determining module 14 and an indication module 15, where:

the determining module 14 is configured to determine whether a stop indication returned by the destination node is received, or whether a quantity of sent encoded sub data packet groups reaches a maximum quantity of sending times; and the indication module 15 is configured to: when the determining module 14 determines that the stop indication is received, or the determining module 14 determines that the quantity of sent encoded sub data packet groups reaches the maximum quantity of sending times, stop sending the encoded sub data packet groups to the destination node, where the stop indication is returned after the destination node parses out the data packet.

Figure 19:
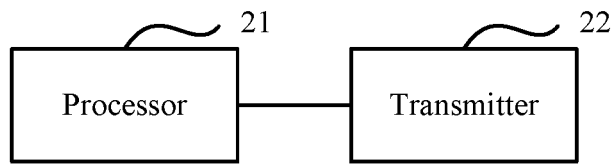
FIG. 19 is a schematic structural diagram of another data packet transmission device according to an embodiment of the present invention.

Referring to FIG. 19, another structure of the device includes a processor 21 and a transmitter 22, where:

the processor 21 is configured to: acquire multiple sub data packets obtained by means of division, perform inter-packet combination encoding on the acquired multiple sub data packets, and obtain multiple encoded sub data packet groups, where one of the encoded sub data packet groups includes at least one encoded sub data packet; and the transmitter 22 is configured to send, separately through at least two transmission paths, the multiple sub data packet groups obtained by the processor 21 to a destination node.

When the device is an intermediate node, if the device implements a function of the intermediate node in step 101 to step 104 shown in FIG. 4 or a function of the intermediate node in step 601 to step 604 shown in FIG. 16, the processor 21 is specifically configured to: receive a data packet from a source node, and divide the received data packet into multiple sub data packets; if the device implements a function of the intermediate node in step 301 to step 304 shown in FIG. 9, the processor 21 is specifically configured to receive multiple sub data packets sent by a source node, where the multiple sub data packets are obtained after the source node divides a data packet.

When the device is a source node, that is, when the device may implement a function of the source node in step 401 to step 403 shown in FIG. 11, the processor 21 is specifically configured to divide a data packet into multiple sub data packets.

Further, the processor 21 is specifically configured to: determine a combination encoding mode by means of negotiation in advance with the destination node, or determine a combination encoding mode by itself and notify the destination node of the used combination encoding mode; and perform inter-packet combination encoding on the multiple sub data packets according to the determined combination encoding mode, and obtain the multiple encoded sub data packet groups.

Further, the combination encoding mode determined by the processor 21 is a linear combination manner, and the processor 21 is specifically configured to: select, in the determined linear combination manner, at least one sub data packet from the multiple sub data packets to perform combination encoding, so as to acquire an encoded sub data packet group.

Further, the processor 21 is specifically configured to: determine a degree of combination encoding by using a determined degree distribution function, randomly select sub data packets whose quantity is not greater than the degree from the sub data packets, and combine sub data packets selected each time into one encoded sub data packet group; or is configured to perform, by using a determined generator matrix, combination encoding on the sub data packets to generate encoded sub data packet groups.

Further, when the device is the intermediate node in steps shown in FIG. 4, FIG. 9, or FIG. 16, the processor 21 is specifically configured to select, in the determined linear combination manner, at least one sub data packet from the multiple sub data packets to perform orthogonalization on linear combination manners, so that content of encoded sub data packet groups obtained by any two intermediate nodes is different.

Further, when the device is the source node in steps shown in FIG. 11, the transmitter 22 is specifically configured to: send the multiple encoded sub data packet groups to the destination node through the at least two transmission paths, where linear combination manners of the encoded sub data packet groups sent on the transmission paths are orthogonal to each other, so that content of the encoded sub data packet groups sent on the two transmission paths is different.

Further, the processor 21 is further configured to: determine whether a stop indication returned by the destination node is received, or whether a quantity of sent encoded sub data packet groups reaches a maximum quantity of sending times; and when determining that the stop indication is received, or determining that the quantity of sent encoded sub data packet groups reaches the maximum quantity of sending times, trigger the transmitter 22 to stop sending the encoded sub data packet groups to the destination node, where the stop indication is returned after the destination node parses out the data packet.

Figure 20:
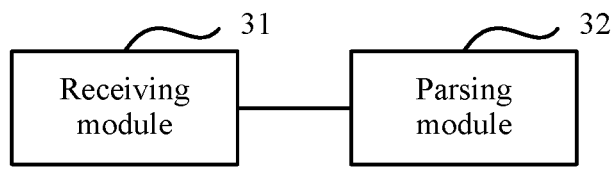
FIG. 20 is a schematic structural diagram of a third data packet transmission device according to an embodiment of the present invention.

An embodiment of the present invention further describes another data packet transmission device, and the device may implement a function of the destination node in step 21 to step 22 shown in FIG. 2, where a description is as follows:

Referring to FIG. 20, the device includes a receiving module 31 and a parsing module 32, where:

the receiving module 31 is configured to receive encoded sub data packet groups sent by a front end node through multiple transmission paths; and the parsing module 32 is configured to parse out the data packet according to the encoded sub data packet groups received by the receiving module 31 and an obtained combination encoding mode.

Figure 18B:
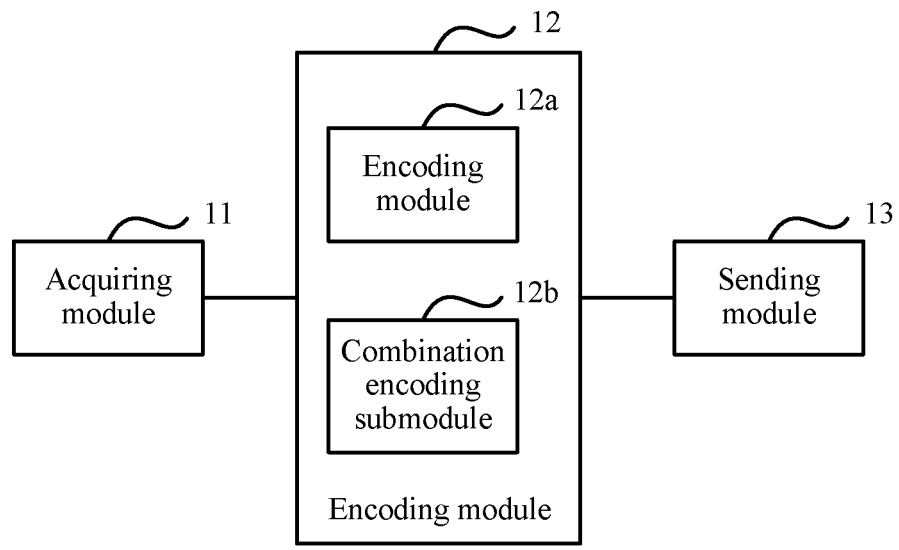
Figure 18C:
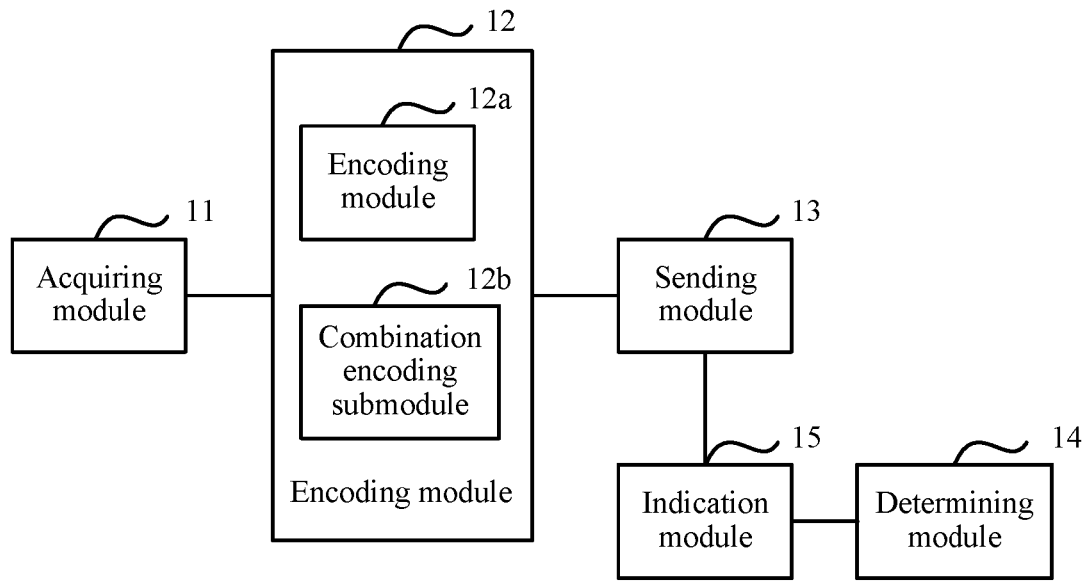

Further, according to differences between the front end nodes described in FIG. 18(a) to FIG. 18(c), functions of the receiving module 31 are also different, and descriptions are respectively as follows:

When the front end node is at least two intermediate nodes, the receiving module 31 is specifically configured to receive encoded sub data packet groups sent by the at least two intermediate nodes through at least two transmission paths.

When the front end node is a source node and at least one intermediate node, the receiving module 31 is specifically configured to receive encoded sub data packet groups sent by the source node and the at least one intermediate node through at least two transmission paths.

When the front end node is a source node, the receiving module 31 is specifically configured to receive encoded sub data packet groups sent by the source node through at least two transmission paths.

Each encoded sub data packet group is obtained after inter-packet combination encoding is performed on at least one sub data packet, and the sub data packet is obtained by dividing a data packet to be sent to the destination node.

Further, the parsing module 32 is specifically configured to parse out the data packet according to the encoded sub data packet groups received by the receiving module 31 and a combination encoding mode negotiated in advance with the front end node; or obtain the combination encoding mode from a notification message or a header of the sub data packet groups, and parse out the data packet according to the encoded sub data packet groups received by the receiving module 31 and the obtained combination encoding mode.

Further, the parsing module 32 is further configured to: according to the received encoded sub data packet groups and a combination encoding mode negotiated in advance, or according to the received encoded sub data packet groups and a combination encoding mode obtained from a notification message or a header of the sub data packet groups, determine whether the data packet can be parsed out; if the data packet can be parsed out, return a stop indication; and otherwise, continue to receive the encoded sub data packet groups until the data packet is parsed out or no encoded sub data packet group can be received.

Figure 21:
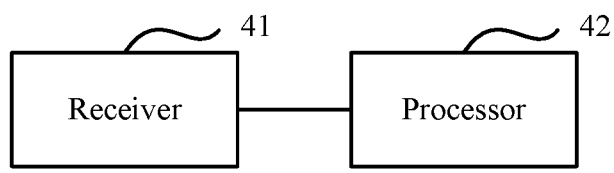
FIG. 21 is a schematic structural diagram of a fourth data packet transmission device according to an embodiment of the present invention.

Referring to FIG. 21, another structure of the device includes a receiver 41 and a processor 42 connected to the receiver 41, where:

the receiver 41 is configured to receive encoded sub data packet groups sent by a front end node through multiple transmission paths; and the processor 42 is configured to parse out the data packet according to the encoded sub data packet groups received by the receiver 41 and an obtained combination encoding mode.

Further, according to differences between the front end nodes described in FIG. 19, functions of the receiver 41 are also different, and descriptions are respectively as follows:

When the front end node is at least two intermediate nodes, the receiver 41 is specifically configured to receive encoded sub data packet groups sent by the at least two intermediate nodes through at least two transmission paths.

When the front end node is a source node and at least one intermediate node, the receiver 41 is specifically configured to receive encoded sub data packet groups sent by the source node and the at least one intermediate node through at least two transmission paths.

When the front end node is a source node, the receiver 41 is specifically configured to receive encoded sub data packet groups sent by the source node through at least two transmission paths.

Each encoded sub data packet group is obtained after inter-packet combination encoding is performed on at least one sub data packet, and the sub data packet is obtained by dividing a data packet to be sent to the destination node.

Further, the processor 42 is specifically configured to parse out the data packet according to the encoded sub data packet groups received by the receiver 41 and a combination encoding mode negotiated in advance with the front end node; or obtain the combination encoding mode from a notification message or a header of the sub data packet groups, and parse out the data packet according to the encoded sub data packet groups received by the receiver 41 and the obtained combination encoding mode.

Further, the processor 42 is further configured to: according to the received encoded sub data packet groups and a combination encoding mode negotiated in advance, or according to the received encoded sub data packet groups and a combination encoding mode obtained from a notification message or a header of the sub data packet groups, determine whether the data packet can be parsed out; if the data packet can be parsed out, return a stop indication; and otherwise, continue to receive the encoded sub data packet groups until the data packet is parsed out or no encoded sub data packet group can be received.

An embodiment of the present invention describes a data packet transmission system, where the transmission system includes a front end node and a destination node. For functions of and a connection relationship between logical parts in the front end node, refer to descriptions in FIG. 18(*a*) to FIG. 18(*c*) and in FIG. 19, and for functions of and a connection relationship between logical parts in the destination node, refer to descriptions in FIG. 20 and FIG. 21.

Persons skilled in the art should understand that the embodiments of this application may be provided as a method, a system, or a computer program product. Therefore, this application may use a form of hardware only embodiments, software only embodiments, or embodiments with a combination of software and hardware. In addition, this application may use a form of a computer program product that is implemented on one or more computer-usable storage media (including but not limited to a disk memory, a CD-ROM, an optical memory, and the like) that include computer-usable program code.

This application is described with reference to the flowcharts and/or the block diagrams of the method, the device (system), and the computer program product according to the embodiments of this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of another programmable data processing device to generate a machine, so that an apparatus for implementing a specific function in one or more processes in the flowcharts and/or in one or more blocks in the block diagrams is generated by using the instructions executed by a computer or a processor of another programmable data processing device.

These computer program instructions may be stored in a computer readable memory that can instruct the computer or another programmable data processing device to work in a specific manner, so that an artifact that includes an instruction apparatus is generated by using the instructions stored in the computer readable memory. The instruction apparatus implements a specific function in one or more processes in the flowcharts and/or in one or more blocks in the block diagrams.

These computer program instructions may be loaded onto a computer or another programmable data processing device, so that a series of operations and steps are performed on the computer or the another programmable device to generate computer-implemented processing. Therefore, the instructions executed on the computer or the another programmable device provide steps for implementing a specific function in one or more processes in the flowcharts and/or in one or more blocks in the block diagrams.

In a typical configuration, the computer device includes one or more processors (CPU), an input/output interface, a network interface, and a memory. The memory may include a non-persistent memory, a random access memory (RAM), a non-volatile memory, and/or another form that are in a computer readable medium, for example, a read-only memory (ROM) or a flash memory (flash memory). The memory is an example of the computer readable medium. The computer readable medium includes persistent, non-persistent, movable, and unmovable media that may implement information storage by using any method or technology. Information may be a computer readable instruction, a data structure, a program module, or other data. An example of a computer storage medium includes but is not limited to a phase change memory (PCM), a static random access memory (SRAM), a dynamic random access memory (DRAM), another type of random access memory (RAM), a read-only memory (ROM), an electrically erasable programmable read-only memory (EEPROM), a flash memory or another memory technology, a compact disc read-only memory (CD-ROM), a digital versatile disc (DVD) or other optical storage, a cassette magnetic tape, tape and disk storage or another magnetic storage device or any other non-transmission media that may be configured to store information that a computing device can access. According to the definition in this specification, the computer readable medium does not include transitory computer readable media (transitory media), such as a modulated data signal and a carrier.

Although some preferred embodiments of the present application have been described, persons skilled in the art can make changes and modifications to these embodiments once they learn the basic inventive concept. Therefore, the following claims are intended to be construed as to cover the embodiments and all changes and modifications falling within the scope of the present application.

Obviously, persons skilled in the art can make various modifications and variations to this application without departing from the spirit and scope of this application. This application is intended to cover these modifications and variations of this application provided that they fall within the scope of protection defined by the following claims and their equivalent technologies.

What is claimed is:

1. A data packet transmission method, wherein the method comprises:

acquiring, by a front end node, multiple sub data packets obtained by division;

performing, by the front end node, inter-packet combination encoding on the multiple sub data packets, and obtaining multiple encoded sub data packet groups, wherein one of the encoded sub data packet groups comprises at least one encoded sub data packet; and sending, by the front end node, the multiple encoded sub data packet groups to a destination node separately through at least two transmission paths.

2. The method according to claim 1, wherein the front end node comprises at least two intermediate nodes, and the acquiring, by a front end node, multiple sub data packets obtained by division comprises:
separately receiving, by the at least two intermediate nodes, a data packet from a source node; and
separately dividing, by the at least two intermediate nodes, the received data packet into multiple sub data packets.

3. The method according to claim 1, wherein the front end node is a source node, and the acquiring, by a front end node, multiple sub data packets obtained by division comprises:
dividing, by the source node, a data packet into multiple sub data packets.

4. The method according to claim 1, wherein the front end node comprises at least two intermediate nodes, and the acquiring, by a front end node, multiple sub data packets obtained by division comprises:
receiving, by the at least two intermediate nodes, multiple sub data packets sent by a source node, wherein the multiple sub data packets are obtained after the source node divides a data packet.

5. The method according to claim 1, wherein the front end node comprises a source node and at least one intermediate node, and the acquiring, by a front end node, multiple sub data packets obtained by division comprises:
receiving, by the at least one intermediate node, a data packet from the source node; and
separately dividing, by the source node and the at least one intermediate node, the data packet into multiple sub data packets.

6. The method according claim 1, wherein the performing, by the front end node, inter-packet combination encoding on the multiple sub data packets, and obtaining multiple encoded sub data packet groups comprises:
performing, by the front end node, inter-packet combination encoding on the multiple sub data packets in a combination encoding mode determined by negotiation in advance with the destination node, and obtaining the multiple encoded sub data packet groups; or after performing inter-packet combination encoding on the multiple sub data packets in a combination encoding mode determined by the front end node, and obtaining the multiple encoded sub data packet groups, notifying, by the front end node, the destination node of the used combination encoding mode.

7. The method according to claim 6, wherein the performing, by the front end node, inter-packet combination encoding on the multiple sub data packets in a combination encoding mode determined by negotiation in advance with the destination node or in a combination encoding mode determined by the front end node, and obtaining the multiple encoded sub data packet groups comprises:
selecting, by the front end node in a linear combination manner determined by negotiation in advance with the destination node or in a linear combination manner determined by the front end node, at least one sub data packet from the multiple sub data packets to perform inter-packet combination encoding, so as to acquire an encoded sub data packet group.

8. The method according to claim 6, wherein the performing, by the front end node, inter-packet combination encoding on the multiple sub data packets in a combination encoding mode determined by negotiation in advance with the destination node or in a inter-packet combination encoding mode determined by the front end node, and obtaining the multiple encoded sub data packet groups comprises:

determining, by the front end node, a degree of combination encoding by using a degree distribution function determined by negotiation in advance or determined by the front end node; and
randomly selecting, by the front end node from the sub data packets, sub data packets whose quantity is not greater than the degree, and combining sub data packets selected each time into one encoded sub data packet group; or
performing, by the front end node by using a generator matrix determined by negotiation in advance or determined by the front end node, inter-packet combination encoding on the sub data packets to generate encoded sub data packet groups.

9. A data packet transmission method, wherein the method comprises:
receiving, by a destination node, encoded sub data packet groups sent by a front end node through multiple transmission paths; and
parsing out, by the destination node, a data packet according to the received encoded sub data packet groups and an obtained combination encoding mode.

10. The method according to claim 9, wherein the parsing out, by the destination node, a data packet according to the received encoded sub data packet groups and an obtained combination encoding mode comprises:
parsing out, by the destination node, the data packet according to the received encoded sub data packet groups and a combination encoding mode negotiated in advance with the front end node; or
obtaining, by the destination node, a combination encoding mode from a notification message or a header of the sub data packet groups, and parsing out the data packet according to the received encoded sub data packet groups and the obtained combination encoding mode determined by the front end node.

11. The method according to claim 9, wherein the receiving, by a destination node, encoded sub data packet groups sent by a front end node through multiple transmission paths comprises:
when the front end node is at least two intermediate nodes, receiving encoded sub data packet groups sent by the at least two intermediate nodes through at least two transmission paths; or
when the front end node is a source node and at least one intermediate node, receiving encoded sub data packet groups sent by the source node and the at least one intermediate node through at least two transmission paths; or
when the front end node is a source node, receiving encoded sub data packet groups sent by the source node through at least two transmission paths, wherein each encoded sub data packet group is obtained after inter-packet combination encoding is performed on at least one sub data packet, and the sub data packet is obtained by dividing a data packet to be sent to the destination node.

12. The method according to claim 9, wherein the parsing out, by the destination node, a data packet according to the received encoded sub data packet groups and an obtained combination encoding mode comprises:
determining, by the destination node according to the received encoded sub data packet groups and a combination encoding mode negotiated in advance, or by the destination node according to the received encoded sub data packet groups and a combination encoding mode obtained from a notification message or a header of the sub data packet groups, whether the data packet can be parsed out; if the data packet can be parsed out, returning a stop indication; and if the data packet cannot be parsed out, continuing to receive the encoded sub data packet groups until the data packet is parsed out or no encoded sub data packet group can be received.

13. A data packet transmission device, wherein the device comprises:
  a processor, configured to acquire multiple sub data packets obtained by division;
  the processor, configured to: perform inter-packet combination encoding on the multiple sub data packets acquired by the acquiring module, and obtain multiple encoded sub data packet groups, wherein one of the encoded sub data packet groups comprises at least one encoded sub data packet; and
  a transmitter, configured to send, separately through at least two transmission paths, the multiple sub data packet groups obtained by the encoding module to a destination node.

14. The device according to claim 13, wherein when the device is an intermediate node, the processor is specifically configured to: receive a data packet from a source node, and divide the received data packet into multiple sub data packets.

15. The device according to claim 13, wherein when the device is a source node, the processor is specifically configured to divide a data packet into multiple sub data packets.

16. The device according to claim 13, wherein when the device is an intermediate node, the processor is specifically configured to receive multiple sub data packets sent by a source node, wherein the multiple sub data packets are obtained after the source node divides a data packet.

17. The device according to claim 13, wherein the processor specifically comprises:
  determine a combination encoding mode by negotiation in advance with the destination node, or determine a combination encoding mode and notify the destination node of the used combination encoding mode; and
  perform inter-packet combination encoding on the multiple sub data packets in the combination encoding mode determined, and obtain the multiple encoded sub data packet groups.

18. The device according to claim 17, wherein:
  the combination encoding mode determined by the processor is a linear combination manner; and
  the processor is specifically configured to: select, in the linear combination manner determined, at least one sub data packet from the multiple sub data packets to perform combination encoding, so as to acquire an encoded sub data packet group.

19. A data packet transmission device, wherein the device comprises:
  a receiver, configured to receive encoded sub data packet groups sent by a front end node through multiple transmission paths; and
  a processor, configured to parse out a data packet according to the encoded sub data packet group received by the receiving module and an obtained combination encoding mode.

20. The device according to claim 19, wherein the processor is specifically configured to parse out the data packet according to the encoded sub data packet groups received by the receiver and a combination encoding mode negotiated in advance with the front end node; or
  obtain the combination encoding mode from a notification message or a header of the sub data packet groups, and parse out the data packet according to the encoded sub data packet groups received by the receiver and the obtained combination encoding mode.

* * * * *